United States Patent
Qu

(10) Patent No.: US 12,155,719 B2
(45) Date of Patent: Nov. 26, 2024

(54) INFORMATION PROCESSING METHOD, APPARATUS, SYSTEM, ELECTRONIC DEVICE AND STORAGE MEDIUM

(71) Applicants: China Mobile Communication Co., Ltd Research Institute, Beijing (CN); China Mobile Communications Group Co., Ltd., Beijing (CN)

(72) Inventor: Wei Qu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 18/264,959

(22) PCT Filed: Feb. 8, 2022

(86) PCT No.: PCT/CN2022/075516
§ 371 (c)(1),
(2) Date: Aug. 10, 2023

(87) PCT Pub. No.: WO2022/171082
PCT Pub. Date: Aug. 18, 2022

(65) Prior Publication Data
US 2024/0314197 A1    Sep. 19, 2024

(30) Foreign Application Priority Data
Feb. 10, 2021 (CN) .......................... 202110184807.5

(51) Int. Cl.
*G06F 15/16* (2006.01)
*G16Y 40/35* (2020.01)
(Continued)

(52) U.S. Cl.
CPC .......... *H04L 67/1012* (2013.01); *G16Y 40/35* (2020.01); *H04L 67/12* (2013.01)

(58) Field of Classification Search
CPC ...... H04L 67/12; H04L 67/1012; G16Y 40/35
(Continued)

(56) References Cited

U.S. PATENT DOCUMENTS

| | | | |
|---|---|---|---|
| 7,167,850 B2 * | 1/2007 | Stanfill | ................. G06F 9/4494 709/200 |
| 7,577,628 B2 * | 8/2009 | Stanfill | ..................... G06F 9/50 706/45 |

(Continued)

FOREIGN PATENT DOCUMENTS

| | | |
|---|---|---|
| CN | 107291538 A | 10/2017 |
| CN | 108243246 A | 7/2018 |

(Continued)

*Primary Examiner* — Moustafa M Meky
(74) *Attorney, Agent, or Firm* — Price Heneveld LLP

(57) ABSTRACT

An information processing method, an apparatus, a system, an electronic device and a storage medium are provided. The method includes: generating, by a first functional component, a resource graph by abstracting a capability of an IoT device; where the resource graph is configured to manage and/or orchestrate an available capability of a heterogeneous IoT device; acquiring, by a second functional component, a task to be processed, and producing a computation graph corresponding to the task to be processed; and performing, by a third functional component, a task allocation based on the resource graph and the computation graph.

20 Claims, 6 Drawing Sheets

(51) Int. Cl.
*H04L 67/1012* (2022.01)
*H04L 67/12* (2022.01)

(58) Field of Classification Search
USPC .......................................................... 709/220
See application file for complete search history.

(56) References Cited

U.S. PATENT DOCUMENTS

| | | | | |
|---|---|---|---|---|
| 7,636,699 | B2* | 12/2009 | Stanfill | G06F 9/4494 |
| | | | | 712/201 |
| 8,468,530 | B2* | 6/2013 | Fraenkel | G06F 9/5044 |
| | | | | 718/104 |
| 9,069,610 | B2* | 6/2015 | Chakravorty | G06F 9/50 |
| 9,128,763 | B2* | 9/2015 | Sarkar | G06F 9/505 |
| 10,382,558 | B2* | 8/2019 | Choi | H04L 67/125 |
| 11,099,892 | B2* | 8/2021 | Kambatla | G06F 9/5077 |
| 11,551,144 | B2* | 1/2023 | Foerster | G06N 3/08 |
| 11,861,474 | B2* | 1/2024 | Foerster | G06F 16/9024 |
| 2007/0022077 | A1* | 1/2007 | Stanfill | G06F 9/4494 |
| | | | | 706/52 |
| 2007/0179923 | A1* | 8/2007 | Stanfill | G06F 9/4494 |
| | | | | 706/50 |
| 2011/0307957 | A1 | 12/2011 | Barcelo et al. | |
| 2012/0134548 | A1 | 5/2012 | Rhoads et al. | |
| 2013/0287188 | A1 | 10/2013 | Patil et al. | |
| 2017/0124452 | A1 | 5/2017 | Tucker et al. | |
| 2018/0139726 | A1* | 5/2018 | Choi | H04L 67/1082 |
| 2018/0247197 | A1 | 8/2018 | Tucker et al. | |
| 2020/0184366 | A1* | 6/2020 | Mandal | G06N 3/042 |
| 2020/0249998 | A1 | 8/2020 | Che et al. | |
| 2021/0027197 | A1* | 1/2021 | Foerster | G06N 3/105 |
| 2022/0092412 | A1* | 3/2022 | Srivastava | G06N 3/08 |
| 2023/0237375 | A1* | 7/2023 | Foerster | G06N 3/105 |
| | | | | 706/12 |

FOREIGN PATENT DOCUMENTS

| | | |
|---|---|---|
| CN | 110750342 A | 2/2020 |
| CN | 111290852 A | 6/2020 |
| CN | 112187859 A | 1/2021 |
| CN | 112272227 A | 1/2021 |
| CN | 112328378 A | 2/2021 |
| JP | 2014505896 A | 3/2014 |
| JP | 2014506080 A | 3/2014 |
| JP | 2018538607 A | 12/2018 |
| WO | 2020125454 A1 | 6/2020 |

* cited by examiner

INFORMATION PROCESSING METHOD, APPARATUS, SYSTEM, ELECTRONIC DEVICE AND STORAGE MEDIUM

CROSS REFERENCE OF RELATED APPLICATION

The present disclosure is the U.S. national phase of PCT Application PCT/CN2022/075516 filed on Feb. 8, 2022, which claims a priority of Chinese patent disclosure No. 202110184807.5 filed on Feb. 10, 2021, which is incorporated herein by reference in its entirety.

TECHNICAL FIELD

The present disclosure relates to the field of the Internet of Things (IoT), and in particular to an information processing method, an apparatus, a system, an electronic device and a storage medium.

BACKGROUND

Edge computing is a computing method that offloads (i.e., distributes) computing tasks on the edge of the network closer to IoT devices. Compared with cloud computing, the edge computing does not need to upload a large amount of user original data to the cloud data center. Therefore, the edge computing can effectively solve the problems of delay, reliability, energy consumption, communication bandwidth consumption, user privacy and security and other issues in the data processing process, especially has a greater value and broad application prospects in application scenarios that require a strict standard for data processing delay, user privacy and reliability, etc., such as autonomous driving, Virtual Reality (VR), Augmented Reality (AR) and other application scenarios.

However, the intelligent applications and/or services used to realize the application scenarios based on Artificial Intelligence (AI) usually need to perform computing-intensive computing tasks that require high computing power and/or storage space, which brings great challenges to high-heterogeneous edge side of which resources are constrained (i.e., limited computing power and/or storage space), that is, how to make full use of resource-constrained and highly heterogeneous IoT devices to perform computing tasks has become an urgent problem to be solved.

SUMMARY

To solve related technical problems, embodiments of the present disclosure provide an information processing method, an apparatus, a system, an electronic device, and a storage medium.

The technical scheme of the embodiment of the present disclosure is implemented as follows.

An information processing method is provided in an embodiment of the present disclosure, including:
  generating, by a first functional component, a resource graph by abstracting a capability of an Internet of Things (IoT) device; where the resource graph is configured to manage and/or orchestrate an available capability of a heterogeneous IoT device;
  acquiring, by a second functional component, a task to be processed, and producing a computation graph corresponding to the task to be processed; and
  performing, by a third functional component, a task allocation based on the resource graph and the computation graph.

In some embodiments of the preset disclosure, the producing the computation graph corresponding to the task to be processed includes:
  decomposing, by the second functional component, the task to be processed into at least one operator, and determining a relationship between the at least one operator;
  producing the computation graph corresponding to the task to be processed, based on the at least one operator and the relationship between the at least one operator.

In some embodiments of the preset disclosure, the decomposing by the second functional component the task to be processed into at least one operator includes:
  decomposing, by the second functional component, the task to be processed through a first strategy, to obtain the at least one operator.

In some embodiments of the preset disclosure, the producing the computation graph corresponding to the task to be processed based on the at least one operator and the relationship between the at least one operator includes:
  abstracting, by the second functional component, each of the at least one operator into corresponding nodes, and determining a relationship between the nodes based on the relationship between the at least one operator;
  producing the computation graph corresponding to the task to be processed, based on the determined nodes and the relationship between the nodes.

In some embodiments of the preset disclosure, a node of the computation graph represents one operator of the task to be processed; an edge of the computation graph represents a relationship between two adjacent nodes.

In some embodiments of the present disclosure, the task to be processed includes at least one of:
  a machine learning model that needs to be trained;
  a machine learning model that needs to be inferred.

In some embodiments of the preset disclosure, the method further includes:
  optimizing, by the second functional component, the produced computation graph;
  performing, by the third functional component, the task allocation based on the resource graph and the optimized computation graph.

In some embodiments of the present disclosure, the optimizing the produced computation graph includes at least one of:
  operator fusion;
  constant folding;
  static memory planning pass; and
  data layout transformation.

In some embodiments of the preset disclosure, the generating the resource graph by abstracting the capability of the IoT device includes:
  discovering, by the first functional component, the IoT device in a network;
  detecting the capability of the IoT device;
  for each IoT device, abstracting the IoT device into corresponding nodes based on the capability of the corresponding IoT device; and
  generating the resource graph based on the abstracted nodes.

In some embodiments of the preset disclosure, a node of the resource graph represents at least a part of the capability of the IoT device; an edge of the resource graph represents a relationship between two adjacent nodes.

In some embodiments of the present disclosure, the method further includes:

when the first functional component detects that the IoT device changes, updating the resource graph based on the detected change situation of the IoT device.

In some embodiments of the preset disclosure, the performing the task allocation based on the resource graph and the computation graph includes:

generating, by the third functional component, at least one task allocation strategy through a second strategy, based on the resource graph and the computation graph; determining a task allocation strategy with a best performance from the at least one task allocation strategy; and performing the task allocation based on the task allocation strategy with the best performance; where the task allocation strategy is configured to allocate the task to be processed to at least one IoT device.

In some embodiments of the preset disclosure, the generating the at least one task allocation strategy through the second strategy includes:

generating, by the third functional component, at least one resource subgraph through the second strategy, based on the resource graph and the computation graph; where each resource subgraph includes a task allocation strategy; a node of the resource subgraph represents at least a part of the capability of the IoT device; an edge of the resource subgraph represents a relationship between two adjacent nodes.

In some embodiments of the preset disclosure, the determining the task allocation strategy with the best performance from the at least one task allocation strategy includes:

predicting, by the third functional component, a performance of each task allocation strategy; and determining the task allocation strategy with the best performance based on the predicted performance of each task allocation strategy.

In some embodiments of the preset disclosure, the predicting the performance of each tasking strategy includes:

extracting, by the third functional component, features of the computation graph to obtain a first feature set, and extracting features of each resource subgraph to obtain a plurality of second feature sets; where each resource subgraph includes a task allocation strategy;

for each task allocation strategy, predicting the performance of the corresponding task allocation strategy based on the first feature set and the corresponding second feature set.

In some embodiments of the preset disclosure, the extracting by the third functional component the features of the computation graph to obtain the first feature set and extracting the features of each resource subgraph to obtain the plurality of second feature sets includes:

extracting, by the third functional component, the features of the computation graph through a feature extracting network to obtain the first feature set, and extracting the features of each resource subgraph through the feature extracting network to obtain the plurality of second feature sets.

In some embodiments of the preset disclosure, the predicting the performance of the corresponding task allocation strategy based on the first feature set and the corresponding second feature set includes:

obtaining, by the third functional component, predicted data corresponding to the corresponding task allocation strategy through a prediction network, based on the first feature set and the corresponding second feature set; and determining the predicted performance of the corresponding task allocation strategy based on the predicted data corresponding to the corresponding task allocation strategy.

In some embodiments of the present disclosure, the predicted data includes at least one of:

a predicted duration of executing the task to be processed;
a predicted energy consumption of executing the task to be processed; and
a predicted reliability of executing the task to be processed.

In some embodiments of the preset disclosure, the determining the predicted performance of the corresponding task allocation strategy based on the predicted data corresponding to the corresponding task allocation strategy includes:

performing, by the third functional component, a weighting processing on the predicted data corresponding to the corresponding task allocation strategy according to a preset weight, to determine the predicted performance of the corresponding task allocation strategy.

In some embodiments of the preset disclosure, the feature extraction network is obtained through a training based on a training data set; an optimized network parameter is obtained through the training; the optimized network parameter is configured to extract features favorable to improve a performance prediction accuracy.

In some embodiments of the preset disclosure, the prediction network is obtained through a training based on a training data set; an optimized network parameter is obtained through the training; the optimized network parameter is configured to improve a performance prediction accuracy.

In some optional embodiments of the present disclosure, the training data set can be continuously updated by accumulating historical data and/or generating new data by random walk, so that the training process has the capability of continuous learning.

In some embodiments of the preset disclosure, the method further includes:

after performing the task allocation, the third functional component acquiring an actual performance when the task to be processed is executed based on the task allocation strategy with the best performance; and storing the task allocation strategy with the best performance and the obtained actual performance into the training data set.

An information processing method is further provided in an embodiment of the present disclosure, including:

acquiring a task to be processed; and producing a computation graph corresponding to the task to be processed; where the task to be processed includes a computing task; a node of the computation graph represents one operator of the task to be processed; an edge of the computation graph represents a relationship between two adjacent nodes;

optimizing the produced computation graph, to obtain an optimized computation graph; where the optimized computation graph is configured to perform a task allocation in combination with a resource graph; the resource graph is generated by abstracting a capability of an Internet of Things (IoT) device; the resource graph is configured to manage and/or orchestrate an available capability of a heterogeneous IoT device.

In some embodiments of the preset disclosure, the producing the computation graph corresponding to the task to be processed includes:

decomposing the task to be processed into at least one operator, and determining a relationship between the at least one operator;

producing the computation graph corresponding to the task to be processed, based on the at least one operator and the relationship between the at least one operator.

In some embodiments of the preset disclosure, the decomposing the task to be processed into at least one operator includes:

decomposing the task to be processed through a first strategy, to obtain the at least one operator.

In some embodiments of the preset disclosure, the producing the computation graph corresponding to the task to be processed based on the at least one operator and the relationship between the at least one operator includes:

abstracting each of the at least one operator into corresponding nodes, and determining a relationship between the nodes based on the relationship between the at least one operator;

producing the computation graph corresponding to the task to be processed, based on the determined nodes and the relationship between the nodes.

In some embodiments of the present disclosure, the optimizing the produced computation graph includes at least one of:

operator fusion;
constant folding;
static memory planning pass; and
data layout transformation.

An information processing apparatus is further provided in an embodiment of the present disclosure, including:

a first functional component, configured to generate a resource graph by abstracting a capability of an Internet of Things (IoT) device; where the resource graph is configured to manage and/or orchestrate an available capability of a heterogeneous IoT device;

a second functional component, configured to acquire a task to be processed, and produce a computation graph corresponding to the task to be processed; and a third functional component, configured to perform a task allocation based on the resource graph and the computation graph.

An information processing apparatus is further provided in an embodiment of the present disclosure, including:

a first processing unit, configured to: acquire a task to be processed, and produce a computation graph corresponding to the task to be processed; where the task to be processed includes a computing task; a node of the computation graph represents one operator of the task to be processed; an edge of the computation graph represents a relationship between two adjacent nodes;

a second processing unit, configured to: optimize the produced computation graph, to obtain an optimized computation graph; where the optimized computation graph is configured to perform a task allocation in combination with a resource graph; the resource graph is generated by abstracting a capability of an Internet of Things (IoT) device; the resource graph is configured to manage and/or orchestrate an available capability of a heterogeneous IoT device.

An information processing system is further provided in an embodiment of the present disclosure, including:

a first functional component, configured to generate a resource graph by abstracting a capability of an Internet of Things (IoT) device; where the resource graph is configured to manage and/or orchestrate an available capability of a heterogeneous IoT device;

a second functional component, configured to acquire a task to be processed, and produce a computation graph corresponding to the task to be processed; and a third functional component, configured to perform a task allocation based on the resource graph and the computation graph;

where the first functional component, the second functional component and the third functional component are arranged on at least two electronic devices.

An electronic device is further provided in an embodiment of the present disclosure, including: a processor and a memory configured to store a computer program executable on the processor, where the processor is configured to execute the computer program to perform the above method.

A storage medium is further provided in an embodiment of the present disclosure, storing a computer program, where the computer program is executed by a processor to perform the above method.

According to the information processing method, the apparatus, the system, the electronic device and the storage medium, the first functional component generates a resource graph by abstracting a capability of an IoT device, the resource graph is configured to manage and/or orchestrate an available capability of a heterogeneous IoT device; the second functional component acquires a task to be processed, and generates a computation graph corresponding to the task to be processed; the third functional component performs a task allocation based on the resource graph and the computation graph. According to the embodiments of the present disclosure, by abstracting the capability of the IoT device, the resource graph for managing and/or arranging the available capability on the heterogeneous IoT devices is generated, and a task allocation is performed based on the computation graph corresponding to the task to be processed and the resource graph. Therefore, a resource-constrained and highly heterogeneous IoT device may be efficiently managed and flexibly scheduled, that is, the resource-constrained and highly heterogeneous IoT device may be fully utilized to perform the task to be processed (such as computationally intensive deep learning task).

DETAILED DESCRIPTION

The application will be further described in detail below in conjunction with the accompanying drawings and embodiments.

With the breakthrough of deep learning technology and the promotion and popularization of the 5th generation mobile communication technology (5G, 5th Generation), intelligent applications and/or services based on Artificial Intelligence at the edge of the Internet of Things have also been growing in recent years, and are used in vehicles. Encouraging initial results have been achieved in areas such as networking, smart elderly care, smart communities, smart cities, smart homes, and industrial Internet. In this case, edge computing resources can be considered for distributed inference and/or training of machine learning models. However, compared with the powerful computing power and abundant storage space of cloud computing, resource-constrained edge environments are often difficult to support computing-intensive deep learning tasks. Therefore, cross-device collaborative distributed edge computing can be considered to solve the problem of constrained resources in the edge environment.

In related technologies, the distributed training and reasoning in the edge deep learning system mainly adopts the method of coarse-grained hierarchical model segmentation and layer scheduling, and the divided sub-models are deployed on the device side, the edge side and the cloud respectively. The underlying implementation of this coarse-grained hierarchical model segmentation completely depends on third-party programming frameworks (also called software platforms or operator libraries), such as TensorFlow, Caffe, Torch, etc., which cannot fully utilize resource-constrained and highly heterogeneous It is difficult to construct IoT devices to perform computationally intensive deep learning tasks, thus limiting the improvement of overall system performance.

Based on this, according to the embodiments of the present disclosure, by abstracting the capability of the IoT device, the resource graph for managing and/or arranging the available capability on the heterogeneous IoT devices is generated, and a task allocation is performed based on the computation graph corresponding to the task to be processed and the resource graph. Therefore, a resource-constrained and highly heterogeneous IoT device may be efficiently managed and flexibly scheduled, that is, the resource-constrained and highly heterogeneous IoT device may be fully utilized to perform the task to be processed (such as computationally intensive deep learning task).

Figure 1:
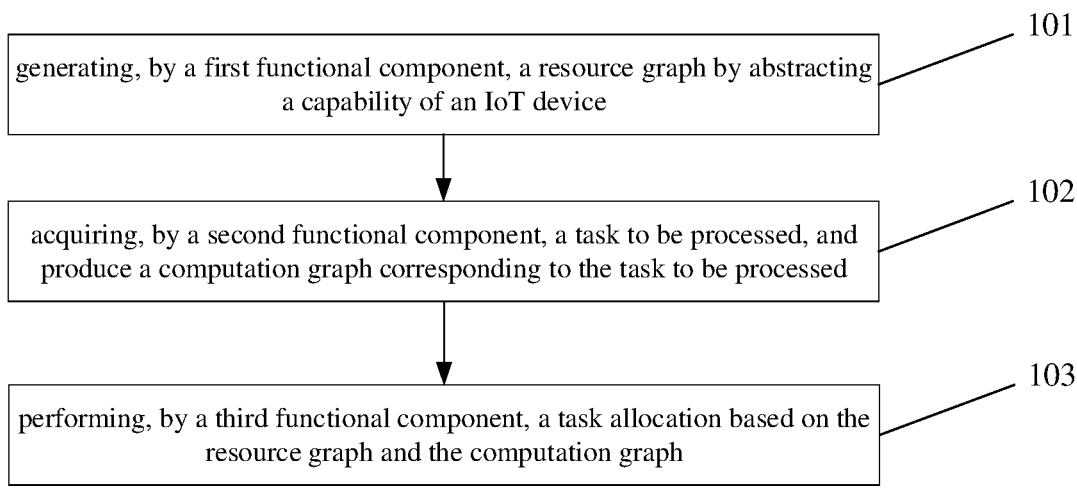
FIG. 1 is a schematic flowchart of an information processing method in an embodiment of the present disclosure.

An embodiments of the present disclosure provides an information processing method, as shown in FIG. 1, the method includes:

Step 101: generating, by a first functional component, a resource graph (also called resource knowledge graph or resource knowledge graph) by abstracting a capability of an IoT device;

Here, the resource graph is used for managing and/or orchestrating the capability available on heterogeneous IoT devices;

Step 102: acquiring, by a second functional component, a task to be processed, and producing a computation graph (also called a calculation flow graph or a data flow graph) corresponding to the task to be processed;

Step 103: performing, by a third functional component, a task allocation based on the resource graph and the computation graph.

Here, it should be noted that, in various embodiments of the present disclosure, the nodes of the resource graph represent at least part of the capability of an IoT device; the edges of the resource graph represent the relationship between two adjacent nodes (also be called the association relationship between two adjacent nodes), the relationship can include communication relationship and affiliation relationship, and the communication relationship can be reflected in information including the information transmission rate and transmission delay between two adjacent nodes that can characterize communication strength.

In practical applications, the tasks to be processed include computing tasks, and the computing tasks may include general computing tasks and intensive computing tasks such as training and/or inferring machine learning models (also called deep models, deep learning models, or deep neural networks) and other calculations. Computation-intensive computing tasks have higher requirements on computing power and/or storage capacity, and are more suitable for task allocation based on the resource graph and the computation graph. In other words, by adopting the information processing method provided by the embodiment of the present disclosure, it is possible to make full use of resource-constrained and highly heterogeneous IoT devices to perform computation-intensive computation tasks.

Among them, a heterogeneous IoT device refers to: in a network including a plurality of IoT devices and servers, the hardware of one IoT device is different from that of another IoT device, and/or, the server of one IoT device Different from the server of another IoT device. Among them, the difference between the hardware of one IoT device and the hardware of another IoT device refers to: a central processing unit (CPU), a graphics processing unit (GPU), and a bus interface chip (BIC) of an IoT device, digital signal processor (DSP) and other processing hardware or random access memory (RAM), read-only memory (ROM) and other storage hardware The model of an IoT device is different from the hardware model of another IoT device; the server of an IoT device is different from the server of another IoT device means: the back-end program or operating system corresponding to an IoT device is different from that of another IoT device The corresponding back-end programs or operating systems are different, in other words, there are differences at the software level between two IoT devices.

In actual application, the IoT device may include a mobile phone, a personal computer (PC), a wearable smart device, an intelligent gateway, a computing box, etc.; the PC may include a desktop computer, a notebook computer, a tablet computer, etc.; the above-mentioned wearable smart devices may include smart watches, smart glasses, and the like.

In actual application, the information processing method provided by the embodiment of the present disclosure is applied to an information processing system, and the system may include the first functional component, the second functional component, and the third functional component; where, the first The functional component, the second functional component, and the third functional component may be implemented by electronic device, such as a server; of course, the first functional component, the second functional component, and the third functional component may also be set on the same electronic device, or any two functional components of the first functional component, the second functional component and the third functional component may be set on the same electronic device.

For step 101, in an embodiment, the generating the resource graph by abstracting the capability of the IoT device includes: discovering, by the first functional component, the IoT device in a network; detecting the capability of the IoT device; for each IoT device, abstracting the IoT device into corresponding nodes based on the capability of the corresponding IoT device; and generating the resource graph based on the abstracted nodes.

Specifically, in practical applications, the discovery of IoT devices may also be referred to as IoT devices in the sensing edge network; the edge network refers to the edge of the telecommunications network (the edge network includes a part of or all the aggregation layer network and the access layer network, it is the last segment of the network to access the user). The discovery or perception can also be understood as detection, for example, the first functional component can detect IoT devices in edge networks based on the Dynamic Host Configuration Protocol (DHCP), using zero configuration networking (ZEROCONF, ZERO CONConfiguration networking) technology. Of course, the first functional component may also be set to discover or sense the IoT device in other ways according to requirements, which is not limited in this embodiment of the present disclosure.

After discovering the IoT device, the first functional component may detect the capability of the corresponding IoT device through information interaction with the corresponding IoT device; for example, the first functional component may send a capability request to the corresponding IoT device message, and determine the capability of the corresponding IoT device according to the message replied by the corresponding IoT device to the capability request message.

Here, the capability of the IoT device may include at least one of the following:
calculate ability;
storage capacity.

The capability of the IoT device refers to the service capability of the IoT device, which can be understood as the resource of the corresponding IoT device; correspondingly, at least part of the capability of an IoT device can be understood as at least part of the resource of an IoT device, Available capacity on an IoT device can be understood as available resources on an IoT device, i.e., idle resources (also referred to as idle capacity, idle capacity, idle capacity, idle resources, or idle resources); that is, computing power Refers to the computing resources available to the corresponding IoT devices; storage capacity refers to the storage resources (i.e., storage space) available to the corresponding IoT devices.

In addition, communication between nodes is required to reflect the communication relationship between nodes.

Based on this, in the resource graph, the capability available on heterogeneous IoT devices may include at least one of the following:
calculate ability;
storage capacity;
communication ability.

The communication capability can also be referred to as communication resources, which can be specifically understood as the communication strength between two nodes, for example, the bandwidth resource and information transmission rate provided by the edge network for communication between IoT devices, transmission delay, etc.; for another example, the transmission rate, transmission delay, etc. between one part of an IoT device's capabilities and another part of its capabilities.

In practical application, the first functional component may use software-defined technology to abstract physical IoT devices into virtualized nodes, and the nodes may contain capability information of corresponding IoT devices. According to different capabilities of IoT devices, different nodes can be abstracted; for an IoT device, the abstracted nodes can include at least one of the following:
device node; able to represent the computing power and storage capacity of the corresponding IoT device;
computing nodes; able to represent the computing power of the corresponding IoT device;
storage node; capable of representing the storage capabilities of the corresponding IoT device.

In actual application, the resource graph generated based on the abstracted nodes may include:
the first functional component determining the features of each node, and determines the relationship between a plurality of nodes; the features are at least used to describe the corresponding node's corresponding Internet of Things device information and at least part of the Internet of Things device's capability information;
based on the determined features and relationships between nodes, generating a resource graph.

Here, in actual application, there may a plurality of features in the nodes, therefore, the features can also be called feature vectors, feature sets, feature vector sets or feature sets; because the features contain a plurality of description information (that is, the corresponding nodes correspond to IoT device information and at least part of the capability information of the IoT device), therefore, the feature may also be referred to as information or an information set. In practical applications, the features of nodes can be used for representation in an ontology description model, which can also be called an entity description model.

In practical applications, since the capability of IoT devices and the relationship between IoT devices are dynamically changing, in order to keep the information corresponding to the virtualized resource graph consistent with the information corresponding to the physical IoT devices, changes in IoT devices need to be monitored to improve the resource graph accuracy, so that the resource graph is dynamically updated as IoT devices change.

Based on this, in an embodiment, the method may further include:
the first functional component monitoring IoT devices;
when a change of the Internet of Things device is detected, updating the resource graph based on the detected change of the Internet of Things device.

For step 102, in an embodiment, the producing the computation graph corresponding to the task to be processed may include:
decomposing, by the second functional component, the task to be processed into at least one operator, and determining a relationship between the at least one operator;
producing the computation graph corresponding to the task to be processed, based on the at least one operator and the relationship between the at least one operator.

In an embodiment, the decomposing the task to be processed into at least one operator may include:
decomposing, by the second functional component, the task to be processed through a first strategy, to obtain the at least one operator.

Specifically, in actual application, the decomposing, by the second functional component, the task to be processed through the first strategy may include:

firstly, a model design (also called task design or program design) is performed based on the functions to be implemented in applications and services. The applications and services may be general applications and services (such as map positioning, online banking, online shopping, etc.), or intelligent applications and services (such as intelligent control, automatic driving, etc.). The functions can be general functions (such as playing videos, accessing browsers, opening web pages, editing files, etc.), or AI-related functions (such as face recognition, behavior recognition, speech recognition, natural language processing, etc.). The model design includes designing an algorithm model (that is, designing the task to be processed, the task to be processed can also be called a task model or a program model, and the task to be processed includes computing tasks) to achieve corresponding functions, such as designing neural Network structure to realize functions such as behavior recognition.

Secondly, the designed algorithm model is transformed into a graph topology, that is, a data flow graph. If the algorithm model corresponds to a certain computing task, the abstracted graph topology can be called a computation graph, or a computing flow graph. The computation graph is composed of nodes and edges, and the nodes of the computation graph represent certain types of operations that the algorithm model needs to perform when the program is implemented (that is, the calculation unit, which can also be called an operator, and can be expressed in English as Operation Node or Operator Node), that is, an operator of the task to be processed; the operator can be a general mathematical operation operator or an array operation operator (for example: addition operator, multiplication operator, etc.), or it can be Neural network operator (that is, the basic operation unit of neural network, such as: convolution operator, pooling operator, etc.); the node includes the following features or information: when the operator represented by the corresponding node is operated (or executed) The consumption or demand for resources such as computing power and storage, that is, the hardware execution cost of the operator, can also be understood as the hardware occupancy data of the operator (for example: CPU occupancy rate, GPU occupancy rate, DSP occupancy rate, FPGA occupancy rate, memory occupancy rate, etc.); the occupancy rate may also be referred to as occupancy, occupancy ratio, occupancy ratio, usage, usage ratio, usage ratio, usage ratio, utilization, utilization ratio, utilization ratio, or utilization ratio; an edge in the computational graph Indicates the relationship between two adjacent nodes, that is, the relationship between two adjacent operators, including the calculation dependency or data dependency between two adjacent operators, and its direction can indicate the sequence of operations or data flow direction; the edge includes the following features or information: the size of data transmitted between two adjacent operators. The features or information of the nodes and edges can be obtained by actually executing corresponding operators or executing them in a simulation environment.

In an embodiment, the producing the computation graph corresponding to the task to be processed based on the at least one operator and the relationship between the operators may include:

abstracting, by the second functional component, each of the at least one operator into corresponding nodes, and determining a relationship between the nodes based on the relationship between the at least one operator;

producing the computation graph corresponding to the task to be processed, based on the determined nodes and the relationship between the nodes.

In actual application, the second functional component may determine the relationship between nodes according to the calculation dependency between the at least one operator, the operation sequence of the at least one operator, or the data flow direction between the at least one operator, and based on the determined nodes and the relationship between the nodes, produce a computation graph corresponding to the task to be processed.

In actual application, in order to improve the performance of the system (that is, the information processing system including the first functional component, the second functional component, and the third functional component), for example, reduce the execution time for executing the task to be processed, the second functional component can optimize the computation graph.

Based on this, in an embodiment, the method may further include:

optimizing, by the second functional component, the produced computation graph;

performing, by the third functional component, the task allocation based on the resource graph and the optimized computation graph.

Here, optimizing the produced computation graph may include at least one of the following:

operator fusion; used to combine a plurality of adjacent small operators into one operator; so that it is not necessary to combine the a plurality of adjacent small operators during the execution of the task to be processed The intermediate result of the operator is saved to the global memory, so as to reduce the execution time of the task to be processed by reducing memory access;

constant merging; it is configured to traverse the nodes in the computation graph and find out the nodes that are completely capable of static calculation, that is, the nodes that are completely dependent on constant input for calculation, on the CPU Calculate these nodes and replace these nodes, that is, combine the calculation of constants in the computation graph. This constant merging algorithm reduces unnecessary repeated calculations and improves computing performance;

static memory planning pass; used to pre-allocate memory to all intermediate result tensors (English can be expressed as Tensor, intermediate results exist in the form of Tensor); by pre-allocating all intermediate result Tensors to optimize the computation graph, it can save runtime costs (for example, enabling a constant folding Pass to be statically executed in the computation graph pre-computation stage);

data layout transformation; used to perform data layout mismatch between data producers (English can be expressed as Producer) and data consumers data layout conversion. Here, the Tensor operation is the basic operator of the computation graph, and the operations involved in the Tensor will have different data layout requirements according to different operators. For example, a deep learning accelerator may use 4×4 tensor operations, so the data needs to be divided into 4×4 blocks for storage to optimize local memory efficiency. In practical applications, in order to optimize the data layout, it is necessary to provide a customized data layout for each operator.

In actual application, the system performance may include at least one of the following:

a predicted duration of executing the task to be processed;
a predicted energy consumption of executing the task to be processed; and
a predicted reliability of executing the task to be processed.

In practical applications, the reliability of executing the task to be processed may be reflected in the success rate of executing the task to be processed.

For step 103, in an embodiment, the performing the task allocation based on the resource graph and the computation graph includes:

generating, by the third functional component, at least one task allocation strategy through a second strategy, based on the resource graph and the computation graph; determining a task allocation strategy with a best performance from the at least one task allocation strategy; and performing the task allocation based on the task allocation strategy with the best performance; where the task allocation strategy is configured to map (allocate) the task to be processed to at least one IoT device.

Here, the task allocation strategy means a strategy for allocating tasks to be processed to at least one IoT device for execution, or for allocating at least one node of the corresponding resource graph to each node of the computation graph, or for allocating tasks to be processed to match tasks with IoT devices, or match task to be processed with resources; in other words, through the task allocation strategy, at least one IoT device can be determined, and the determined at least one IoT Networked devices execute task to be processed as directed by the task allocation policy. In practical application, the task allocation strategy may also be called task allocation method, task allocation mode, task scheduling policy, task scheduling method, task scheduling mode, task scheduling strategy, task scheduling method, task scheduling mode, and so on.

Specifically, in practical applications, the task allocation based on the task allocation strategy with the best performance refers to: based on the task allocation strategy with the best performance, the task to be processed is mapped (that is, allocated) to at least An Internet of Things device, so that the at least one Internet of Things device uses at least part of its own capabilities to execute the task to be processed in a parallel and cooperative manner, such as implementing training and/or reasoning of the machine learning model.

In practical applications, the mapping of the task to be processed to at least one Internet of Things device can also be understood as: allocating at least part of the capability of at least one Internet of Things device to each operator of the task to be processed; in other words, at least one node of the resource graph is assigned to each node of the computation graph. It can be seen that through task allocation, the matching between task to be processed and IoT devices is actually realized, or in other words, the matching between task to be processed and resources (that is, available resources on IoT devices) is realized.

In practical applications, at least one node of the resource graph allocated to each node of the computation graph may be the same or different; that is, an IoT device may use at least part of its own capabilities to implement calculating units corresponding to a plurality of operators. At the same time, a plurality of IoT devices can implement a computing unit corresponding to an operator in a cooperative manner. In addition, nodes without computational dependencies in the computation graph (i.e., operators without computational dependencies) can be executed in parallel (i.e., operations or calculations) on the same or different IoT devices.

In practical application, since the task allocation strategy can indicate at least one node of the resource graph allocated to each node of the computation graph, and the at least one task allocation strategy can be determined based on the resource graph. Therefore, the task allocation strategy can be embodied as a resource subgraph obtained by segmenting the resource graph, and the resource subgraph includes the correspondence between each node in the computation graph and at least one node in the resource graph relation. The second strategy can be realized by means of graph search, graph optimization, subgraph matching, heuristic method, etc., or by random walk method.

Based on this, in an embodiment, the generating the at least one task allocation strategy through the second strategy includes:

generating, by the third functional component, at least one resource subgraph through the second strategy, based on the resource graph and the computation graph; where each resource subgraph includes a task allocation strategy; a node of the resource subgraph represents at least a part of the capability of the IoT device; an edge of the resource subgraph represents a relationship between two adjacent nodes.

In an embodiment, the determining the task allocation strategy with the best performance from the at least one task allocation strategy includes:

predicting, by the third functional component, a performance of each task allocation strategy; and determining the task allocation strategy with the best performance based on the predicted performance of each task allocation strategy.

Specifically, in an embodiment, the predicting the performance of each tasking strategy includes:

extracting, by the third functional component, features of the computation graph to obtain a first feature set, and extracting features of each resource subgraph to obtain a plurality of second feature sets; where each resource subgraph includes a task allocation strategy;

for each task allocation strategy, predicting the performance of the corresponding task allocation strategy based on the first feature set and the corresponding second feature set.

In practical applications, the feature sets (i.e., the first feature set and the second feature set) may also be referred to as features for short, or may be called feature sets, feature vectors, or feature vector sets.

In practical application, the third functional component may extract the first feature set and the second feature set through a feature extraction network.

Based on this, in one embodiment, the extracting by the third functional component the features of the computation graph to obtain the first feature set and extracting the features of each resource subgraph to obtain the plurality of second feature sets includes:

extracting, by the third functional component, the features of the computation graph through a feature extracting network to obtain the first feature set, and extracting the features of each resource subgraph through the feature extracting network to obtain the plurality of second feature sets.

In actual application, the features of the computation graph may include at least one of the following:

computing resources required to execute operators corresponding to each node of the computation graph;
storage resources required to execute the operators corresponding to each node of the computation graph;
communication resources required to be occupied by operators corresponding to each node executing the computation graph.

The features of the resource subgraph may include at least one of the following:
  computing resources available on at least one IoT device;
  storage resources available on at least one IoT device;
  communication resources available on at least one IoT device.

In practical applications, the feature extraction network can be constructed based on a graph neural network (GCN), and the feature extraction network can be trained based on a training data set; an optimized network parameter is obtained through a training procedure; the optimization network parameters of can be used to extract features that are beneficial to improve the performance prediction accuracy.

In actual application, the third functional component can predict the performance of the corresponding task allocation strategy through the prediction network.

Based on this, in an embodiment, the predicting the performance of the corresponding task allocation strategy based on the first feature set and the corresponding second feature set includes:
  obtaining, by the third functional component, predicted data corresponding to the corresponding task allocation strategy through a prediction network, based on the first feature set and the corresponding second feature set; and determining the predicted performance of the corresponding task allocation strategy based on the predicted data corresponding to the corresponding task allocation strategy.

The predicted data may include at least one of the following:
  a predicted duration of executing the task to be processed;
  a predicted energy consumption of executing the task to be processed; and
  a predicted reliability of executing the task to be processed.

In practical applications, the predicted reliability of executing the task to be processed may be reflected in the predicted success rate of executing the task to be processed.

In actual application, according to different application scenarios corresponding to the tasks to be processed, the tasks to be processed have different requirements on the performance of the task allocation strategy, for example, the tasks to be processed need to be processed in the shortest possible time The execution is completed; for another example, the task to be processed needs to consume as little energy as possible.

Based on this, in an embodiment, the determining the predicted performance of the corresponding task allocation strategy based on the predicted data corresponding to the corresponding task allocation strategy includes:
  performing, by the third functional component, a weighting processing on the predicted data corresponding to the corresponding task allocation strategy according to a preset weight, to determine the predicted performance of the corresponding task allocation strategy.

In practical applications, the preset weights can be set according to requirements.

Exemplarily, assuming that the forecast data corresponding to the corresponding task allocation strategy includes three components (that is, including the forecast duration of executing the task to be processed, the forecast energy consumption and the forecast reliability), the following formula can be used to correspond to each component Preset weights for weighting:

$$\eta = Q(\lambda_t, \lambda_e, \lambda_r \dots) \quad (1)$$

Among them, n represents the predicted performance of the corresponding task allocation strategy, $Q(\cdot)$ represents a function that includes weighted information for each component (that is, each type of predicted data, which can be understood as a performance index), and $\lambda_t$ represents the prediction time length, $\lambda_e$ represents predicted energy consumption, and $\lambda_r$ represents predicted reliability.

Since the specific form of $Q(\cdot)$ in expression (1), that is, the specific value of the preset weight, depends on the different requirements of different scenarios for delay, energy consumption, reliability, etc., or the degree of importance or concern, That is, by using a specific function to weight different performance indicators to achieve a trade-off between various performance indicators, and calculate the weighted value of each key performance indicator according to the set formula to obtain the overall system performance, that is, through the expression (1) The obtained predicted performance reflects the overall system performance related to the quality of service (QOS).

In practical application, the prediction network can be constructed based on a deep neural network (DNN), and the prediction network can be trained based on a training data set; an optimized network parameter is obtained through a training procedure; the optimized network parameters can be used to improve the accuracy of performance predictions.

In practical application, in order to improve the accuracy of performance prediction, the training data set can be continuously updated by accumulating historical data and/or generating new data by random walk, so that the training process has the ability of continuous learning. Here, the training data may be referred to as samples or training samples, and may include task allocation strategies and their corresponding actual performance.

Based on this, in an embodiment, the method may further include:
  after performing the task allocation, the third functional component acquiring an actual performance when the task to be processed is executed based on the task allocation strategy with the best performance; and storing the task allocation strategy with the best performance and the obtained actual performance into the training data set.

In practical applications, the feature extraction network and the prediction network can be implemented inside the third functional component, that is, the third functional component performs training and/or inference; they can also be outside the third functional component implementation, i.e. training and/or inference by other functional components.

Figure 2:
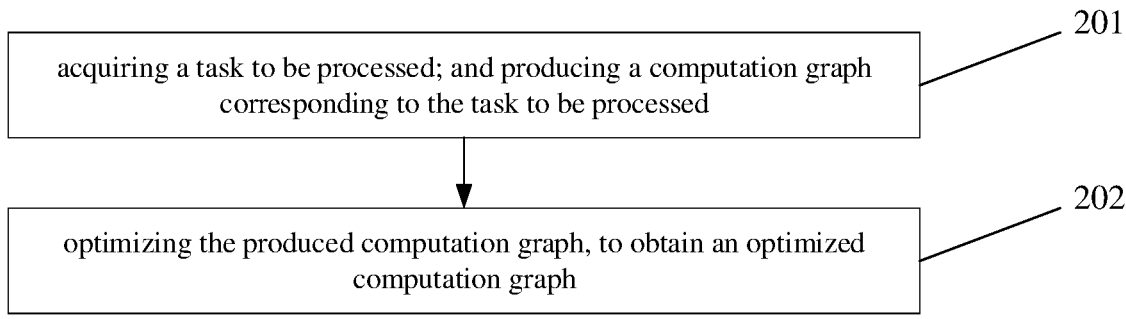
FIG. 2 is a schematic flowchart of another information processing method in an embodiment of the present disclosure.

Correspondingly, the embodiment of the present disclosure also provides an information processing method applied to the second functional component, as shown in FIG. 2, the method includes:
  Step 201: acquiring a task to be processed; and producing a computation graph corresponding to the task to be processed;
    where the task to be processed includes a computing task; a node of the computation graph represents one operator of the task to be processed; an edge of the computation graph represents a relationship between two adjacent nodes;
  Step 202: optimizing the produced computation graph, to obtain an optimized computation graph;
    where the optimized computation graph is configured to perform a task allocation in combination with a resource graph; the resource graph is generated by abstracting a capability of an Internet of Things (IoT)

device; the resource graph is configured to manage and/or orchestrate an available capability of a heterogeneous IoT device.

In some embodiments of the preset disclosure, the producing the computation graph corresponding to the task to be processed includes:

decomposing the task to be processed into at least one operator, and determining a relationship between the at least one operator;

producing the computation graph corresponding to the task to be processed, based on the at least one operator and the relationship between the at least one operator.

In some embodiments of the preset disclosure, the decomposing the task to be processed into at least one operator includes:

decomposing the task to be processed through a first strategy, to obtain the at least one operator.

In some embodiments of the preset disclosure, the producing the computation graph corresponding to the task to be processed based on the at least one operator and the relationship between the at least one operator includes:

abstracting each of the at least one operator into corresponding nodes, and determining a relationship between the nodes based on the relationship between the at least one operator;

producing the computation graph corresponding to the task to be processed, based on the determined nodes and the relationship between the nodes.

In some embodiments of the present disclosure, the optimizing the produced computation graph includes at least one of:

operator fusion;
constant folding;
static memory planning pass; and
data layout transformation.

Here, it should be noted that the specific processing process of the second functional component has been described in detail above, and will not be repeated here.

According to the embodiment of the present disclosure, the first functional component generates a resource graph by abstracting the capability of IoT devices; the resource graph is configured to manage and/or orchestrate available capabilities on heterogeneous IoT devices; the second functional component obtains the tasks to be processed, and generates a computation graph corresponding to the task to be processed; the third functional component performs task allocation based on the resource graph and the computation graph. According to the embodiment of the present disclosure, by abstracting the capability of the IoT device, the resource graph for managing and/or arranging the available capability on the heterogeneous IoT devices is generated, and a task allocation is performed based on the computation graph corresponding to the task to be processed and the resource graph. Therefore, a resource-constrained and highly heterogeneous IoT device may be efficiently managed and flexibly scheduled, that is, the resource-constrained and highly heterogeneous IoT device may be fully utilized to perform the task to be processed (such as computationally intensive deep learning task).

The present disclosure will be further described in detail below in conjunction with application examples.

Figure 3:
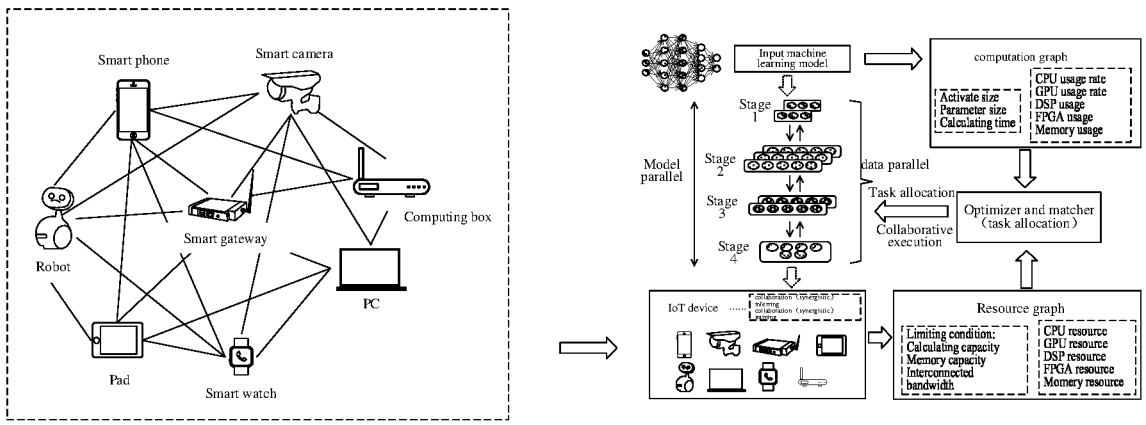
FIG. 3 is a schematic view of a scene in an embodiment of the present disclosure.

As shown in FIG. 3, the purpose of this embodiment is to provide an intelligent distributed edge computing (IDEC) system that supports efficient deep learning across heterogeneous IoT devices. The IDEC system can also be called collaborative decentralization Machine learning (CDML) system, collaborative distributed machine learning system, decentralized machine learning system based on device collaboration, or distributed machine learning system based on device collaboration. Through extensive connection and intelligent perception of edge-side IoT devices, unified resource management and computing power sharing, efficient device collaboration and intelligent scheduling, operator-level computing task decomposition, and task allocation and optimization based on graph convolution, it realized a full-stack optimized system design that supports distributed training and/or reasoning of deep models across heterogeneous IoT devices, and further realizes the sinking of AI models from the cloud center to the edge of the network closer to IoT devices, supporting efficient deployment and execution of edge intelligence services and applications, thereby solving the problems of delay, reliability, energy consumption, communication bandwidth consumption, user privacy and security in the process of data processing in IoT application scenarios.

Figure 4:
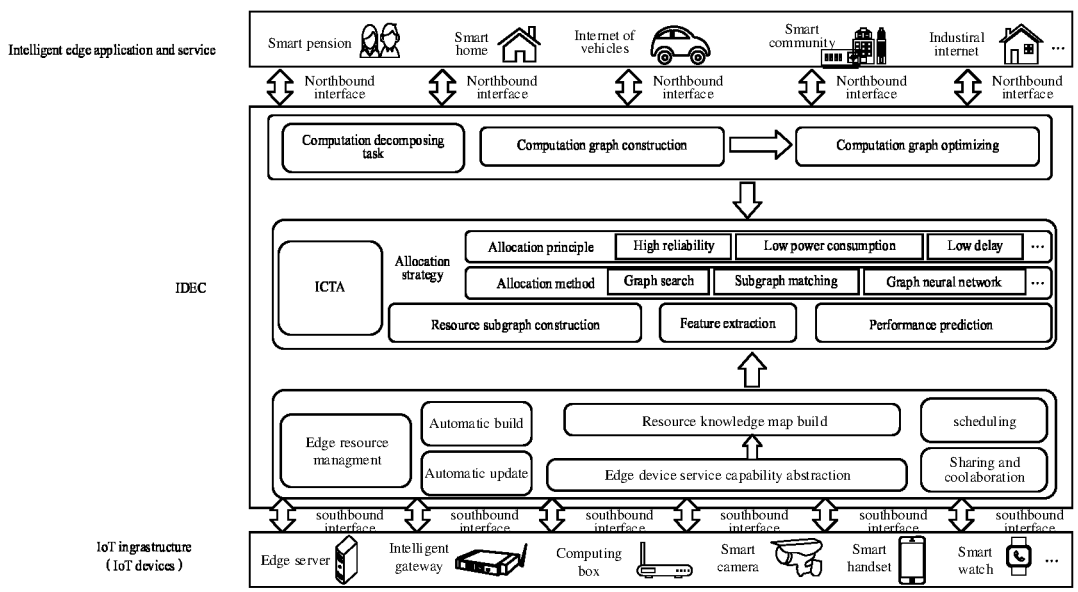
FIG. 4 is a schematic structural view of an Intelligent Distributed Edge Computing (IDEC) system in an embodiment of the present disclosure.

Specifically, this embodiment provides an IDEC system. The IDEC system mainly includes three major modules: an edge resource management module (or IoT device resource management module, which is the first functional component above), a computing task decomposition module (or called the machine learning computing task decomposition module (i.e., the above-mentioned second functional component) and the intelligent computing task allocation (ICTA) module (i.e., the above-mentioned third functional component). As shown in FIG. 4, the IDEC system connects to the widely distributed edge infrastructure of the Internet of Things (that is, edge devices, which can also be called Internet of Things devices) in the southbound direction, and generates a resource graph that supports dynamic construction and update through the edge resource management module. Dynamic perception, unified management, efficient scheduling and sharing and collaboration of various heterogeneous IoT device resources. In the north direction of the IDEC system, the deep learning tasks from intelligent applications and services in actual scenarios are generated through the computing task decomposition module to produce computation graphs, realizing fine-grained operator-level computing task decomposition, providing conditions for parallel computing and distributed processing, and at the same time It is conducive to graph-level optimization of deep learning task execution performance. The middle layer (i.e., core module) of the IDEC system is the ICTA module. Based on the generated resource graph and computation graph, ICTA realizes the cross-device distribution of the underlying deep learning operators. The ICTA module uses the graph convolutional network (GCN) and Deep learning algorithms such as deep neural network (DNN) realize the task allocation strategy corresponding to the best system performance by learning the inherent statistical laws of complex and changeable task scheduling problems between different operating systems on heterogeneous Internet of Things devices. Intelligent decision-making maximizes the use of scattered heterogeneous resources on the edge side of the Internet of Things, thereby improving the overall system performance; at the same time, the ICTA module introduces a continuous learning mechanism to enable the IDEC system to have intelligent self-adaption, realizing "the more you use it, the better it becomes." clever".

It should be noted that the southbound IoT infrastructure of the IDEC system, that is, edge devices, mainly includes two types: terminal devices (that is, smart IoT devices with computing capabilities, such as: smart cameras, smart gateways, computing boxes, smart mobile phones, etc., such devices often have high heterogeneity and resource constraints) and edge servers (that is, smart IoT devices with slightly stronger computing power, storage capacity and management capabilities, responsible for hosting and running the IDEC system, and some large-scale deep learning models); the IDEC system is northbound connected to a variety of intelligent edge applications and services in the IoT field, including: smart elderly care (also called smart elderly care), smart home (also called smart home), car Networking, smart communities, smart cities, industrial Internet, etc.

The function of IDEC system is described in detail below.

First, the functions of the edge resource management module are described with reference to FIG. 5 and FIG. 6.

In related technologies, unified management and scheduling of widely distributed IoT devices on the edge side is an important prerequisite for realizing distributed edge computing with cross-device collaboration. However, due to the diversity of IoT devices, resource constraints, and hardware backend and heterogeneity of the network increases the complexity and uncertainty of resource sharing and interaction.

Figure 5:
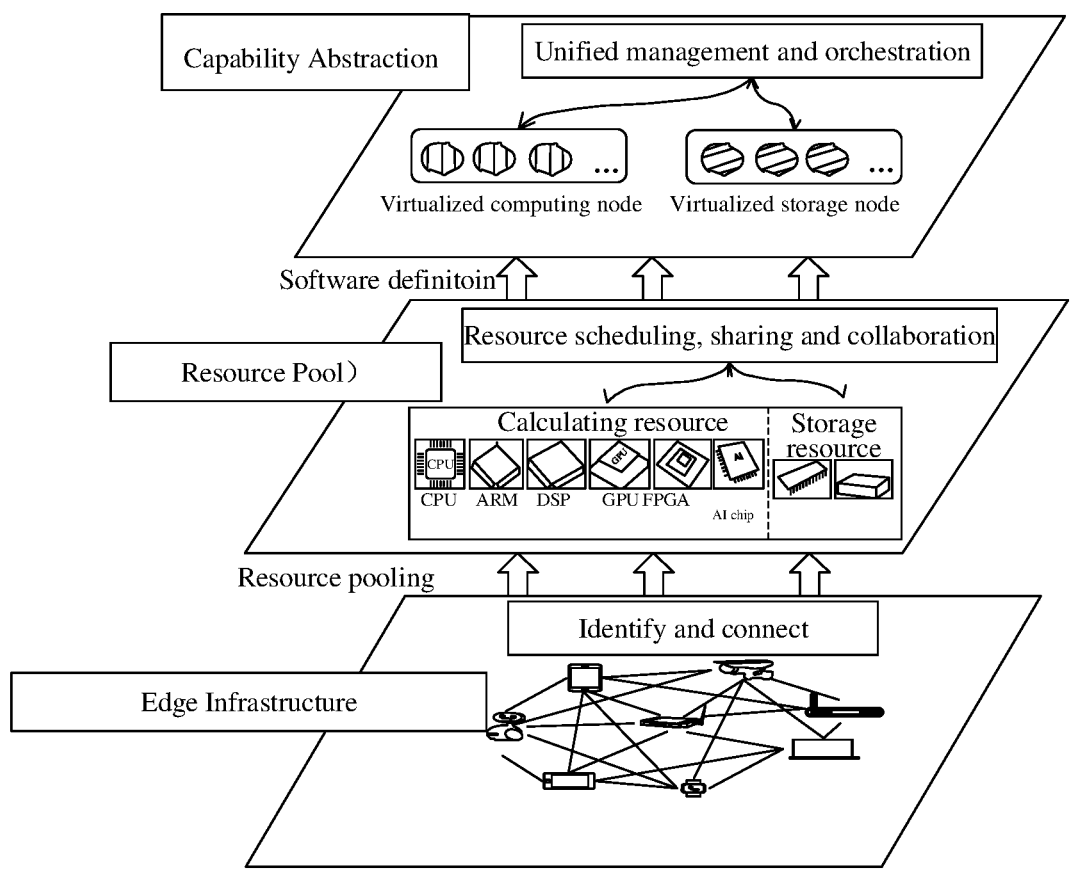
FIG. 5 is a schematic view of an application scene of a service capability abstraction module in an embodiment of the present disclosure.
Figure 6:
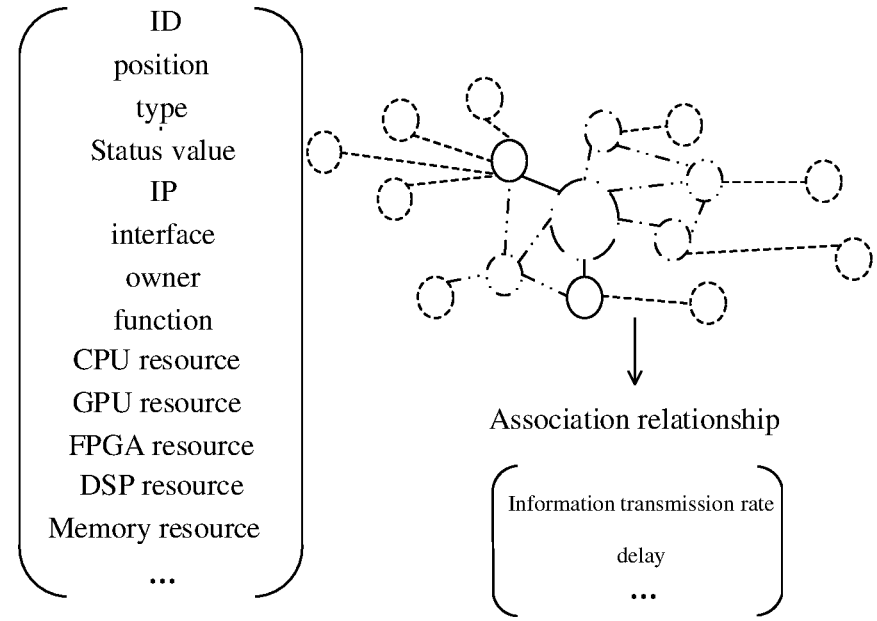
FIG. 6 is a schematic view of a resource knowledge map building module in an embodiment of the present disclosure.

In order to solve the above problems, the edge resource management module adopts technologies such as virtualization, software definition, and knowledge graph, through the functions of the edge device service capability abstraction module (or called IoT device service capability abstraction module) (as shown in FIG. 5) and The function of the resource knowledge graph building block (as shown in FIG. 6) realizes the unified management and orchestration of heterogeneous resources on the distributed edge infrastructure of the Internet of Things, as well as the intelligent perception and collaboration of edge devices. In this way, limited edge resources can be fully utilized for collaborative resource scheduling and task allocation across heterogeneous devices, maximizing resource utilization, and efficient use of heterogeneous edge resources for IDEC systems in resource-constrained edge computing environments. Provides for performing distributed training and/or inference of deep models.

Specifically, the edge device service capability abstraction module is mainly used to solve the problem of heterogeneity, and its fundamental goal is to break the boundaries between heterogeneous hardware, so that a variety of IoT devices can perform deep learning tasks in a collaborative manner. Specifically, it can include three layers. As shown in FIG. 5, the edge infrastructure layer realizes the identification and connection of various heterogeneous devices; the resource pooling layer realizes the computing resources (such as: CPU, GPU, FPGA, ARM, AI chips, etc.) and storage resources (such as: cache, RAM, etc.) management and orchestration. The edge device service capability abstraction module facilitates resource scheduling across heterogeneous edge devices, and contributes to discovering and matching appropriate resources to meet specific computing needs, whereby widely distributed a plurality of edge resources and processing capabilities can be sensed, Reusing and sharing improves resource utilization, thereby improving the overall service capability of the edge side.

In order to further realize the dynamic perception and full understanding of available edge resources, as shown in FIG. 6, the resource knowledge graph building block can use semantic and knowledge engine technology to describe and model interconnected IoT devices. In the resource knowledge graph, nodes represent different edge devices or fine-grained computing and/or storage capabilities abstracted from edge devices. Based on different capabilities represented, virtualized nodes can include device nodes, computing nodes, and storage Node; where, the ontology description model of the device node can include the following information: IoT device information (including device ID, location, type, status value, function, owner, interface, IP information, etc.), and capability information (available CPU, GPU, FPGA, DSP, memory resources, etc.), etc. The edges in the resource knowledge graph represent the association relationship between adjacent nodes. The association relationship represents the interconnection and intercommunication between heterogeneous edge device resources, and further reflects the internal collaboration and sharing mechanism of edge devices. In order to adapt to the dynamic and changeable IoT edge scenarios and cope with the challenges of fluctuating and changing available resources, an automatic update mechanism is introduced in the resource knowledge graph building block to keep consistent with the resource conditions and connection status of physical edge devices. In addition, the use of scheduling and orchestration strategies and shared collaboration mechanisms further improves resource utilization and overall computing power. Based on the resource knowledge graph building block, the IDEC system can realize efficient management and flexible scheduling of limited available resources on heterogeneous distributed edge devices to meet the resource requirements of computing tasks.

Figure 7:
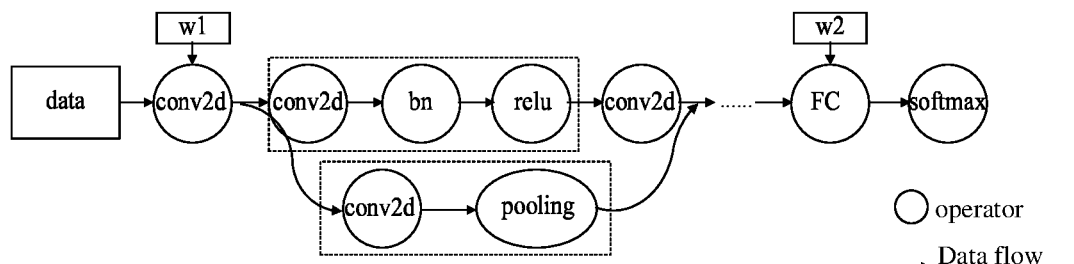
FIG. 7 is a schematic view of a computation graph optimization in an embodiment of the present disclosure.
Figure 7:
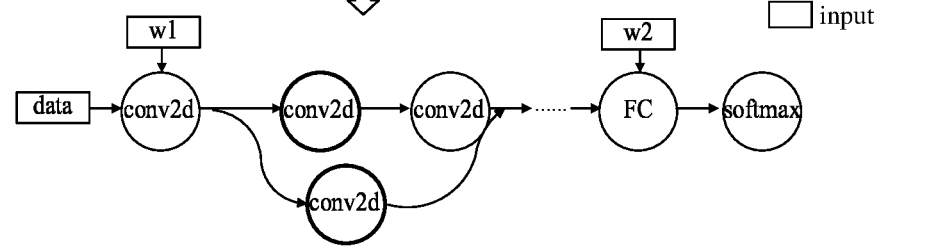

Next, the functions of the computing task decomposition module are described in conjunction with FIG. 7.

The computing task decomposition module has the functions of computation graph construction and computation graph optimization.

The computation graph construction refers to producing a computation graph corresponding to a deep learning computing task. Specifically, deep learning computing tasks are usually some multi-layer deep neural network models, the basic units of which are deep learning operators, such as convolution operators and pooling operators. Abstracted nodes are used to represent operators, and edges are used to represent data flow, data dependencies, or computing dependencies, so that a graph structure that can represent the implementation process of an operator-level program of a deep learning model can be formed, which is called a computation graph and a computation graph, flow graph or data flow graph. As shown in FIG. 7, a computation graph is an expression of deep learning computing tasks in the form of graphs.

Computation graph optimization is to perform some operations on the operators in the computation graph before they are actually assigned and executed, so as to obtain better system performance, such as reducing task execution time. Computation graph optimization methods mainly include: operator fusion, constant merging, static memory planning transfer, and data layout conversion. Among them, operator fusion refers to combining a plurality of adjacent small operators into one operator without saving intermediate results to global memory, so as to reduce execution time by reducing memory access.

Through the construction of the computation graph of the deep learning model and the optimization of the computation graph, it is possible to achieve fine-grained operator-level computing task decomposition, which provides the possibility for parallel processing and distributed execution of operators; at the same time, it is conducive to operator fusion, constant merging and other graph-level optimizations, and provide a prerequisite for the next step of computing task allocation and optimization.

Thirdly, the function of the ICTA module is described with reference to FIG. 8.

On the one hand, the computation graph constructed by the computing task decomposition module provides a global view of operators, but does not specify the specific IoT devices that implement each operator to achieve the best system performance, that is, the computing task allocation strategy has not yet been determined. On the other hand, the resource graph provides the resources available on IoT devices capable of hosting deep learning workloads. Therefore, based on the computation graph and the resource graph, in order to make full use of the scattered resources on the IoT device to efficiently perform computing tasks in a cooperative manner, the ICTA module reasonably allocates the deep learning operators in the computation graph in an optimal way. Give IoT devices with idle resources in the resource graph to achieve the best match between computing tasks and device resources, and realize intelligent decision-making of task allocation strategies corresponding to the best system performance.

Figure 8:
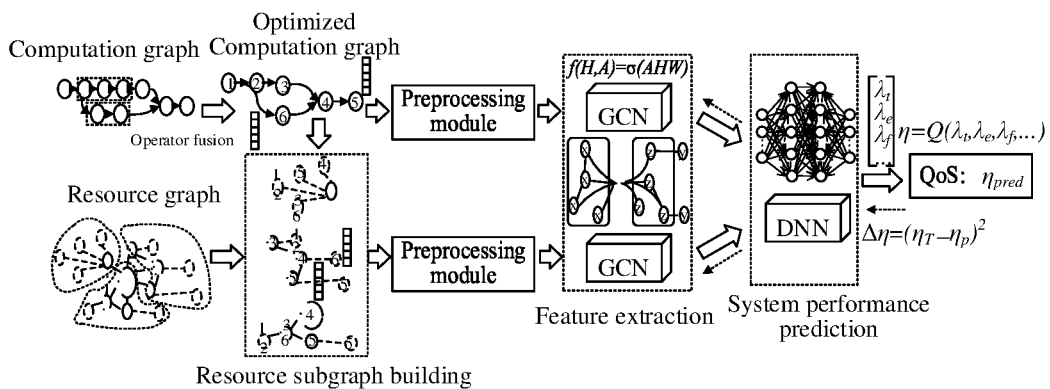
FIG. 8 is a schematic view of an Intelligent Computing Task Allocation (ICTA) module in an embodiment of the present disclosure.

As shown in FIG. 8, the ICTA module may specifically include: a resource subgraph construction module, a feature extraction module, and a performance prediction module.

The resource subgraph construction module is configured to use graph search, graph optimization, subgraph matching, heuristic method or random walk method to construct resource subgraphs, and each resource subgraph carries a specific task allocation strategy.

The feature extraction module is configured to use the GCN algorithm to extract the graph topology features of the resource graph and the computation graph respectively. The extracted features cover the features of computing power, storage, communication and other dimensions that play a decisive role in the efficient execution of deep learning computing tasks.

The performance prediction module is configured to use the DNN algorithm to predict the system performance for a given task allocation strategy (that is, the task allocation strategy carried by each resource subgraph or the corresponding task allocation strategy) before the task is actually executed. The system performance indicators that focus on can include: Execution time (i.e., duration), energy consumption and reliability (e.g. success rate). In practical applications, the performance prediction module can make trade-offs between these three indicators according to the actual needs of different application scenarios (for example, multiplying a larger weight for indicators with a high degree of attention), and finally obtain a comprehensive system performance that represents the overall system index. Finally, the performance prediction module selects the task allocation strategy that can obtain the best system performance for actual task allocation according to the obtained comprehensive index of each task allocation strategy.

In practical applications, end-to-end training can be performed on the GCN model (that is, the above-mentioned feature extraction network) and the DNN model (that is, the above-mentioned prediction network), to learn the potential correspondence between different task allocation strategies and system performance, as well as inherent statistical laws of a complexity of task scheduling a variety of different operating systems among IoT devices, so as to improve the accuracy of system performance prediction.

Through the resource subgraph building block, feature extraction block, and performance prediction block, the ICTA block can solve the problem of optimal matching of computing tasks and device resources, thereby improving resource utilization and overall system performance. The ICTA module reasonably allocates the computing units (i.e., operators) of the deep learning model to various heterogeneous IoT devices according to the task allocation strategy with the best system performance. In this way, the cross-device heterogeneous resources in the IDEC system can be fully utilized Distributed (or called decentralized) execution of computing-intensive deep learning tasks in a multi-device collaboration manner helps distributed edge computing systems improve the deployment and execution efficiency of edge-side intelligent applications. In addition, with the help of the continuous learning mechanism based on historical sample accumulation and random walk strategies, the ICTA module can realize "the more you use it, the smarter it is", which makes the entire IDEC system move closer to the intelligence that integrates self-adaptation and self-learning capabilities step.

Figure 9:
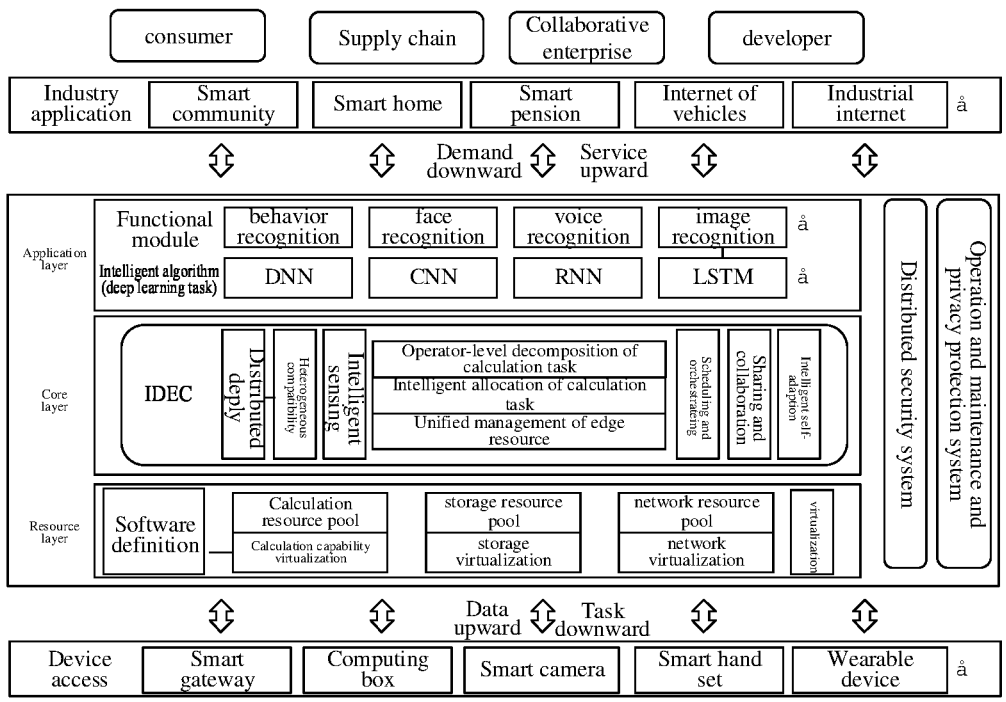
FIG. 9 is a schematic structural view of an IDEC-based intelligent IoT edge computing platform in an embodiment of the present disclosure.

Based on the IDEC system, this embodiment also provides an intelligent IoT edge computing platform. The platform connects with intelligent applications in a plurality of vertical industries through the mode of "demand downlink, service uplink" in the northbound mode, and connects with intelligent applications in a plurality of vertical industries through the "data uplink, uplink" mode in the southbound direction. The "task downlink" mode is linked with a variety of heterogeneous and widely distributed IoT devices. Under the a plurality of guarantee system that integrates operation and maintenance, security and privacy, the entire platform can serve consumers, supply chains, collaborative enterprises and developers, etc. A plurality of types of user groups provide IoT intelligent applications and services, and realize the deployment and execution of various edge intelligent applications and services on widely distributed heterogeneous IoT devices, thereby realizing an end-to-end full-stack optimized IoT edge intelligent ecosystem, thereby unifying the market and accelerating the deployment of smart IoT solutions. As shown in FIG. 9, the platform specifically includes: an application layer, a core layer and a resource layer.

The application layer integrates a variety of common capabilities and intelligent algorithms to transform the intelligent service requirements from specific scenarios in industry applications into functional modules such as behavior recognition and face recognition, and further decompose them into CNN, RNN, etc. A plurality of deep learning tasks and/or models.

The core layer is equipped with the IDEC system, which realizes the fine-grained (i.e., operator-level) decomposition of deep learning tasks from the application layer on the upper side, and realizes the unified management and efficient scheduling of edge resources on the lower side. Based on the resource graph and computation graph, the intelligent allocation and optimization of tasks on a plurality of devices are performed according to the best matching mode of tasks and resources, and finally realize the distributed training and/or inference of machine learning models. The main functions of the core layer include: edge resource management, deep learning computing task decomposition, intelligent computing task allocation, etc. The features and advantages of the core layer include: intelligent perception, heterogeneous compatibility, scheduling and orchestration, shared collaboration, distributed deployment, and intelligent self-adaptation.

The resource layer realizes capability abstraction and resource extraction on IoT devices through technologies such as virtualization and software definition, and is used for virtualization of computing capabilities, virtualization of storage capabilities, and virtualization of network resources.

The embodiments of the present disclosure has the following advantages:

(1) realizing the full-stack optimized system design from the top-level edge intelligent application to the bottom-level widely distributed heterogeneous IoT edge devices, and through the full-stack optimized system design, the IDEC system is heterogeneously compatible, high-performance, and intelligent. The characteristics of adaptation realize the unified management and resource sharing of a large number of heterogeneous IoT edge devices with limited resources, so as to support the distributed training or reasoning of decentralized deep learning models across heterogeneous devices.

(2) through the edge resource management module, intelligent sensing, unified management and collaboration of IoT edge devices are realized, and resource sharing and efficient scheduling for IoT devices are realized to make full use of widely distributed heterogeneous resource constraints IoT devices.

(3) through the computing task decomposing module, the operator-level decomposition of deep learning tasks is realized, and the produced computation graph is conducive to the implementation of parallel processing and distributed computing, that is, it is beneficial to the parallel processing and distributed execution of operators; and, which is conducive to graph-level optimization (also can be understood as operator-level optimization) to improve task execution performance.

(4) considering the complexity and uncertainty of task scheduling between different operating systems on a variety of heterogeneous IoT devices, through the ICTA module, based on the end-to-end training of multi-layer GCN and DNN networks, learn different operating systems Intrinsic complex task scheduling rules, as well as the potential correspondence between different task allocation strategies and system performance, realize accurate prediction of the system performance that may be obtained after the actual execution of a given task allocation strategy before the actual execution of tasks, so as to select Optimal task allocation strategy; through the best match between computing tasks and available resources, intelligent decision-making on the optimal task allocation strategy is realized, thereby maximizing the utilization of edge resources and improving overall system performance.

(5) Through the continuous learning mechanism, realize self-learning and self-adaptation, and achieve the effect of "the more you use, the smarter you are".

Figure 10:
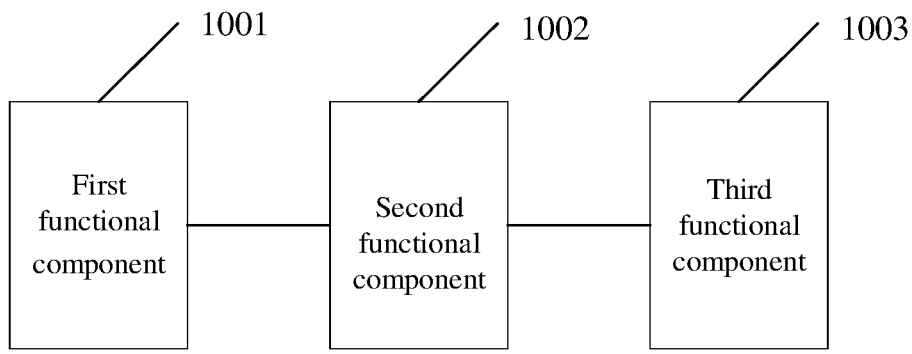
FIG. 10 is a schematic structural view of an information processing apparatus in an embodiment of the present disclosure.

The embodiment of the present disclosure also provides an information processing apparatus, as shown in FIG. 10, the device includes:

a first functional component 1001, configured to generate a resource graph by abstracting a capability of an Internet of Things (IoT) device; where the resource graph is configured to manage and/or orchestrate an available capability of a heterogeneous IoT device;

a second functional component 1002, configured to acquire a task to be processed, and produce a computation graph corresponding to the task to be processed; and a third functional component 1003, configured to perform a task allocation based on the resource graph and the computation graph.

In some embodiments of the preset disclosure, the second functional component 1002 is configured to:

decompose the task to be processed into at least one operator, and determine a relationship between the at least one operator;

produce the computation graph corresponding to the task to be processed, based on the at least one operator and the relationship between the at least one operator.

In some embodiments of the preset disclosure, the second functional component 1002 is configured to:

decompose the task to be processed through a first strategy, to obtain the at least one operator.

In some embodiments of the preset disclosure, the second functional component 1002 is configured to:

abstract each of the at least one operator into corresponding nodes, and determine a relationship between the nodes based on the relationship between the at least one operator;

produce the computation graph corresponding to the task to be processed, based on the determined nodes and the relationship between the nodes.

In some embodiments of the preset disclosure, the second functional component 1002 is configured to optimize the produced computation graph;

the third functional component 1003 is configured to perform the task allocation based on the resource graph and the optimized computation graph.

In some embodiments of the present disclosure, the optimizing the produced computation graph includes at least one of:

operator fusion;

constant folding;

static memory planning pass; and data layout transformation.

In some embodiments of the preset disclosure, the first functional component 1001 is configured to:

discover the IoT device in a network; detect the capability of the IoT device;

for each IoT device, abstract the IoT device into corresponding nodes based on the capability of the corresponding IoT device; and generate the resource graph based on the abstracted nodes.

In some embodiments of the present disclosure, first functional component 1001 is configured to:

when the first functional component detects that the IoT device changes, update the resource graph based on the detected change situation of the IoT device.

In some embodiments of the preset disclosure, the third functional component 1003 is configured to:

generate at least one task allocation strategy through a second strategy, based on the resource graph and the computation graph; determine a task allocation strategy with a best performance from the at least one task allocation strategy; and perform the task allocation based on the task allocation strategy with the best performance; where the task allocation strategy is configured to allocate the task to be processed to at least one IoT device.

In some embodiments of the preset disclosure, the third functional component 1003 is configured to:

generate at least one resource subgraph through the second strategy, based on the resource graph and the computation graph; where each resource subgraph includes a task allocation strategy; a node of the resource subgraph represents at least a part of the capability of the IoT device; an edge of the resource subgraph represents a relationship between two adjacent nodes.

In some embodiments of the preset disclosure, the third functional component 1003 is configured to:

predict a performance of each task allocation strategy; and determine the task allocation strategy with the best performance based on the predicted performance of each task allocation strategy.

In some embodiments of the preset disclosure, the third functional component 1003 is configured to:

extract features of the computation graph to obtain a first feature set, and extract features of each resource subgraph to obtain a plurality of second feature sets; where each resource subgraph includes a task allocation strategy;

for each task allocation strategy, predict the performance of the corresponding task allocation strategy based on the first feature set and the corresponding second feature set.

In some embodiments of the preset disclosure, the third functional component 1003 is configured to:

extract the features of the computation graph through a feature extracting network to obtain the first feature set, and extract the features of each resource subgraph through the feature extracting network to obtain the plurality of second feature sets.

In some embodiments of the preset disclosure, the third functional component 1003 is configured to:

obtain predicted data corresponding to the corresponding task allocation strategy through a prediction network, based on the first feature set and the corresponding second feature set; and determine the predicted performance of the corresponding task allocation strategy based on the predicted data corresponding to the corresponding task allocation strategy.

In some embodiments of the preset disclosure, the third functional component 1003 is configured to:

perform a weighting processing on the predicted data corresponding to the corresponding task allocation strategy according to a preset weight, to determine the predicted performance of the corresponding task allocation strategy.

In some embodiments of the preset disclosure, the third functional component 1003 is configured to:

after performing the task allocation, acquire an actual performance when the task to be processed is executed based on the task allocation strategy with the best performance; and store the task allocation strategy with the best performance and the obtained actual performance into the training data set Here, the function of the first functional component 1001 is equivalent to the function of the edge resource management module in the application embodiment of the present application; the function of the second functional component 1002 is equivalent to the function of the computing task decomposition module in the application embodiment of the present application; The function of the third functional component 1003 is equivalent to the function of the Intelligent Computing Task Allocation (ICTA) module in the application embodiment of the present application.

In practical application, the first functional component 1001, the second functional component 1002 and the third functional component 1003 may be implemented by a processor in the device.

Figure 11:
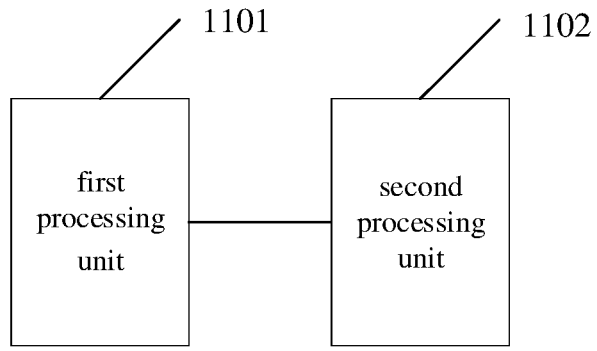
FIG. 11 is a schematic structural view of another information processing apparatus in an embodiment of the present disclosure.

The embodiment of the present disclosure also provides an information processing apparatus, as shown in FIG. 11, the device includes:

a first processing unit 1101, configured to: acquire a task to be processed, and produce a computation graph corresponding to the task to be processed; where the task to be processed includes a computing task; a node of the computation graph represents one operator of the task to be processed; an edge of the computation graph represents a relationship between two adjacent nodes;

a second processing unit 1102, configured to: optimize the produced computation graph, to obtain an optimized computation graph; where the optimized computation graph is configured to perform a task allocation in combination with a resource graph; the resource graph is generated by abstracting a capability of an Internet of Things (IoT) device; the resource graph is configured to manage and/or orchestrate an available capability of a heterogeneous IoT device.

In some embodiments of the preset disclosure, the first processing unit 1101 is configured to:

decompose the task to be processed into at least one operator, and determine a relationship between the at least one operator;

produce the computation graph corresponding to the task to be processed, based on the at least one operator and the relationship between the at least one operator.

In some embodiments of the preset disclosure, the first processing unit 1101 is configured to decompose the task to be processed through a first strategy, to obtain the at least one operator.

In some embodiments of the preset disclosure, the first processing unit 1101 is configured to abstract each of the at least one operator into corresponding nodes, and determine a relationship between the nodes based on the relationship between the at least one operator;

produce the computation graph corresponding to the task to be processed, based on the determined nodes and the relationship between the nodes.

In some embodiments of the present disclosure, the second processing unit 1102 is configured to perform at least one of:

operator fusion;
constant folding;
static memory planning pass; and
data layout transformation.

Here, the function of the first processing unit 1101 and the function of the second processing unit 1102 are equivalent to the functions of the computing task decomposition module in the embodiment of the present disclosure.

In practical application, the first processing unit 1101 and the second processing unit 1102 may be implemented by a processor in the device.

It should be noted that: when the information processing apparatus provided by the above-mentioned embodiments performs information processing based on tasks, the division of the above-mentioned program modules is used as an example for illustration. In actual application, the above-mentioned processing can be assigned to different program modules as required Completion means that the internal structure of the device is divided into different program modules to complete all or part of the processing described above. In addition, the information processing apparatus and the information processing method embodiments provided in the above embodiments belong to the same concept, and the specific implementation process thereof is detailed in the method embodiments, and will not be repeated here.

Figure 12:
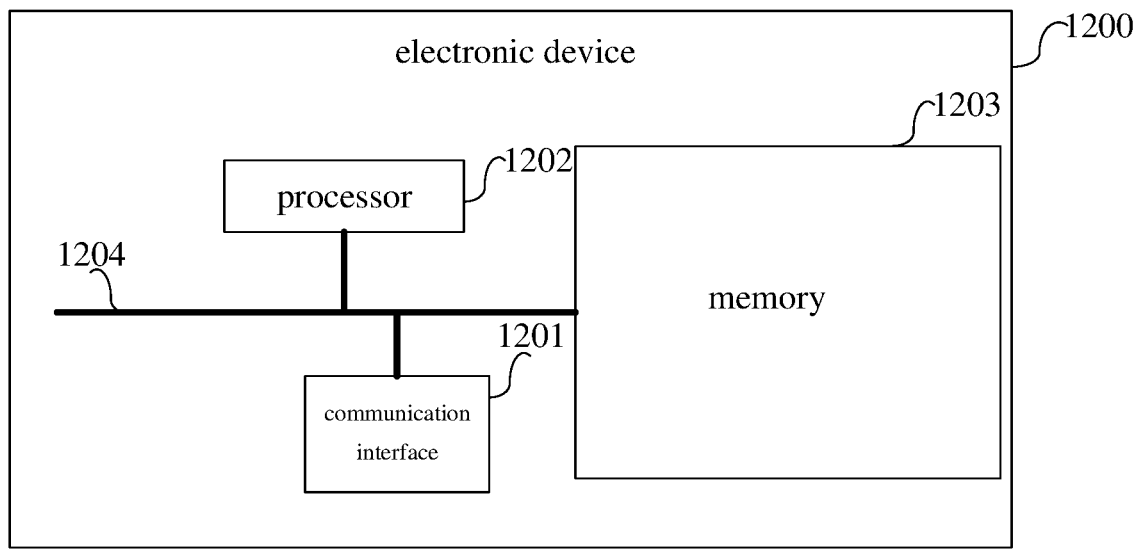
FIG. 12 is a schematic structural view of an electronic device in an embodiment of the present disclosure.

Based on the hardware implementation of the above program modules, and in order to implement the method of the embodiment of the present disclosure, the embodiment of the present disclosure also provides an electronic device, as shown in FIG. 12, the electronic device 1200 includes:

a communication interface 1201, capable of performing information interaction with other electronic devices;

a processor 1202, connected to the communication interface 1201 to implement information interaction with other electronic devices, and is configured to execute the methods provided by one or more of the above technical solutions when running a computer program;

the memory 1203 stores computer programs that can run on the processor 1202.

Here, at least one functional component among the first functional component, the second functional component and the third functional component may be set on the electronic device 1200.

Specifically, in the case where the first functional component, the second functional component and the third functional component are all set on the electronic device 1200, the processor 1202 is configured to:
  generate a resource graph by abstracting a capability of an Internet of Things (IoT) device; where the resource graph is configured to manage and/or orchestrate an available capability of a heterogeneous IoT device;
  acquire a task to be processed, and produce a computation graph corresponding to the task to be processed; and
  perform a task allocation based on the resource graph and the computation graph In some embodiments of the preset disclosure, the processor 1202 is configured to:
  decompose the task to be processed into at least one operator, and determine a relationship between the at least one operator;
  produce the computation graph corresponding to the task to be processed, based on the at least one operator and the relationship between the at least one operator.

In some embodiments of the preset disclosure, the processor 1202 is configured to:
  decompose the task to be processed through a first strategy, to obtain the at least one operator.

In some embodiments of the preset disclosure, the processor 1202 is configured to:
  abstract each of the at least one operator into corresponding nodes, and determine a relationship between the nodes based on the relationship between the at least one operator;
  produce the computation graph corresponding to the task to be processed, based on the determined nodes and the relationship between the nodes.

In some embodiments of the preset disclosure, the processor 1202 is configured to optimize the produced computation graph;
  perform the task allocation based on the resource graph and the optimized computation graph.

In some embodiments of the present disclosure, the processor 1202 is configured to perform at least one of:
  operator fusion;
  constant folding;
  static memory planning pass; and
  data layout transformation.

In some embodiments of the preset disclosure, the processor 1202 is configured to:
  discover the IoT device in a network; detect the capability of the IoT device;
  for each IoT device, abstract the IoT device into corresponding nodes based on the capability of the corresponding IoT device; and
  generate the resource graph based on the abstracted nodes.

In some embodiments of the present disclosure, the processor 1202 is configured to:
  when the first functional component detects that the IoT device changes, update the resource graph based on the detected change situation of the IoT device.

In some embodiments of the preset disclosure, the processor 1202 is configured to:
  generate at least one task allocation strategy through a second strategy, based on the resource graph and the computation graph; determine a task allocation strategy with a best performance from the at least one task allocation strategy; and perform the task allocation based on the task allocation strategy with the best performance; where the task allocation strategy is configured to allocate the task to be processed to at least one IoT device.

In some embodiments of the preset disclosure, the processor 1202 is configured to:
  generate at least one resource subgraph through the second strategy, based on the resource graph and the computation graph; where each resource subgraph includes a task allocation strategy; a node of the resource subgraph represents at least a part of the capability of the IoT device; an edge of the resource subgraph represents a relationship between two adjacent nodes.

In some embodiments of the preset disclosure, the processor 1202 is configured to:
  predict a performance of each task allocation strategy; and determine the task allocation strategy with the best performance based on the predicted performance of each task allocation strategy.

In some embodiments of the preset disclosure, the processor 1202 is configured to:
  extract features of the computation graph to obtain a first feature set, and extract features of each resource subgraph to obtain a plurality of second feature sets; where each resource subgraph includes a task allocation strategy;
  for each task allocation strategy, predict the performance of the corresponding task allocation strategy based on the first feature set and the corresponding second feature set.

In some embodiments of the preset disclosure, the processor 1202 is configured to:
  extract the features of the computation graph through a feature extracting network to obtain the first feature set, and extract the features of each resource subgraph through the feature extracting network to obtain the plurality of second feature sets.

In some embodiments of the preset disclosure, the processor 1202 is configured to:
  obtain predicted data corresponding to the corresponding task allocation strategy through a prediction network, based on the first feature set and the corresponding second feature set; and determine the predicted performance of the corresponding task allocation strategy based on the predicted data corresponding to the corresponding task allocation strategy.

In some embodiments of the preset disclosure, the processor 1202 is configured to:
  perform a weighting processing on the predicted data corresponding to the corresponding task allocation strategy according to a preset weight, to determine the predicted performance of the corresponding task allocation strategy.

In some embodiments of the preset disclosure, the processor 1202 is configured to:
  after performing the task allocation, acquire an actual performance when the task to be processed is executed based on the task allocation strategy with the best performance; and store the task allocation strategy with the best performance and the obtained actual performance into the training data set.

Correspondingly, in the case that the second functional component is set on the electronic device 1200, the processor 1202 is configured to:
  acquire a task to be processed, and produce a computation graph corresponding to the task to be processed; where the task to be processed includes a computing task; a node of the computation graph represents one operator of the task to be processed; an edge of the computation graph represents a relationship between two adjacent nodes;

optimize the produced computation graph, to obtain an optimized computation graph; where the optimized computation graph is configured to perform a task allocation in combination with a resource graph; the resource graph is generated by abstracting a capability of an Internet of Things (IoT) device; the resource graph is configured to manage and/or orchestrate an available capability of a heterogeneous IoT device.

In some embodiments of the preset disclosure, the processors 1202 is configured to:

decompose the task to be processed into at least one operator, and determine a relationship between the at least one operator;

produce the computation graph corresponding to the task to be processed, based on the at least one operator and the relationship between the at least one operator.

In some embodiments of the preset disclosure, the processors 1202 is configured to decompose the task to be processed through a first strategy, to obtain the at least one operator.

In some embodiments of the preset disclosure, the processors 1202 is configured to abstract each of the at least one operator into corresponding nodes, and determine a relationship between the nodes based on the relationship between the at least one operator;

produce the computation graph corresponding to the task to be processed, based on the determined nodes and the relationship between the nodes.

In some embodiments of the present disclosure, the processors 1202 is configured to perform at least one of:

operator fusion;
constant folding;
static memory planning pass; and
data layout transformation.

It should be noted that: for the specific process of the processor 1202 performing the above operations, refer to the method embodiment for details, which will not be repeated here.

Of course, in practical applications, various components in the electronic device 1200 are coupled together through the bus system 1204. It can be understood that the bus system 1204 is configured to realize connection and communication between these components. In addition to the data bus, the bus system 1204 also includes a power bus, a control bus and a status signal bus. However, the various buses are labeled as bus system 1204 in FIG. 12 for clarity of illustration.

The memory 1203 in the embodiment of the present disclosure is configured to store various types of data to support the operation of the electronic device 1200. Examples of such data include: any computer programs for operating on electronic device 1200.

The methods disclosed in the foregoing embodiments of the present disclosure may be applied to the processor 1202 or implemented by the processor 1202. The processor 1202 may be an integrated circuit chip with signal processing capability. In the implementation process, each step of the above method may be implemented by an integrated logic circuit of hardware in the processor 1202 or instructions in the form of software. The aforementioned processor 1202 may be a general-purpose processor, DSP, GPU, or other programmable logic devices, discrete gate or transistor logic devices, discrete hardware components, and the like. The processor 1202 may implement or execute various methods, steps, and logic block diagrams disclosed in the embodiments of the present disclosure. A general purpose processor may be a microprocessor or any conventional processor or the like. The steps of the method disclosed in the embodiments of the present disclosure may be directly implemented by a hardware decoding processor, or implemented by a combination of hardware and software modules in the decoding processor. The software module may be located in a storage medium, and the storage medium is located in the memory 1203. The processor 1202 reads the information in the memory 1203, and completes the steps of the foregoing method in combination with its hardware.

In an exemplary embodiment, the electronic device 1200 may be implemented by one or more Application Specific Integrated Circuits (ASIC), DSP, Programmable Logic Device (PLD), Complex Programmable Logic Device (CPLD), FPGA, general-purpose processor, GPU, controller, micro controller unit (MCU), microprocessor, various AI chips, brain-like chips, or other electronic components, used to execute the aforementioned method.

It can be understood that the memory 1203 in this embodiment of the present disclosure may be a volatile memory or a nonvolatile memory, and may also include both volatile and nonvolatile memories. Among them, the nonvolatile memory can be ROM, Programmable Read-Only Memory (PROM), Erasable Programmable Read-Only Memory (EPROM), Electrically Erasable Programmable read-only memory (EEPROM), FRAM, flash memory (Flash Memory), magnetic surface memory, optical disc, or compact disc read-only memory (CD-ROM); magnetic Surface storage can be disk storage or tape storage. Volatile memory can be RAM, which acts as external cache memory. By way of illustration and not limitation, many forms of RAM are available such as Static Random Access Memory (SRAM), Synchronous Static Random Access Memory (SSRAM), Dynamic Random Access Memory (DRAM), Synchronous Dynamic Random Access Memory (SDRAM), Double Data Rate Synchronous Dynamic Random Access Memory (DDRSDRAM), enhanced Synchronous Dynamic Random Access Memory (ESDRAM), Synchronous Link Dynamic Random Access Memory (SLDRAM), Direct Memory Bus Random Access Memory (DRRAM). The memories described in the embodiments of the present disclosure are intended to include but not limited to these and any other suitable types of memories.

The embodiment of the present disclosure also provides an information processing system, including:

a first functional component, configured to generate a resource graph by abstracting a capability of an Internet of Things (IoT) device; where the resource graph is configured to manage and/or orchestrate an available capability of a heterogeneous IoT device;

a second functional component, configured to acquire a task to be processed, and produce a computation graph corresponding to the task to be processed; and a third functional component, configured to perform a task allocation based on the resource graph and the computation graph;

where the first functional component, the second functional component and the third functional component are arranged on at least two electronic devices.

Figure 13:
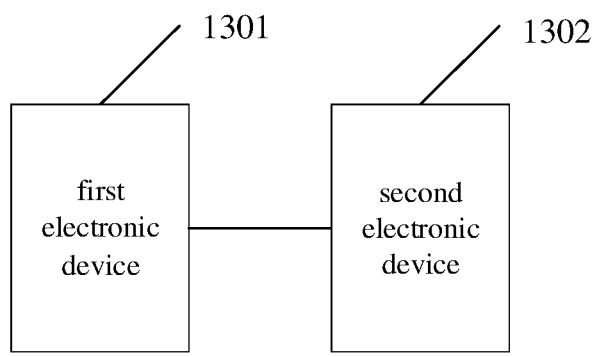
FIG. 13 is a schematic structural view of an information processing system in an embodiment of the present disclosure.

Exemplarily, as shown in FIG. 13, the system may include: a first electronic device 1301 and a second electronic device 1302; the first electronic device 1301 is provided with the second functional component; the second electronic device 1302 The first functional component and the third functional component are provided.

Here, it should be noted that: the specific processing procedures of the first functional component, the second functional component, and the third functional component have been described in detail above, and will not be repeated here.

In an exemplary embodiment, the embodiment of the present disclosure also provides a storage medium, that is, a computer storage medium, specifically a computer-readable storage medium, for example, including a memory 1203 storing a computer program, and the above-mentioned computer program can be processed by the electronic device 1200 The device 1202 is executed to complete the steps described in the foregoing method. The computer-readable storage medium may be memory such as FRAM, ROM, PROM, EPROM, EEPROM, Flash Memory, magnetic surface memory, optical disk, or CD-ROM.

It should be noted that: "first", "second" and the like are used to distinguish similar objects, and not necessarily used to describe a specific order or sequence.

In addition, the technical solutions described in the embodiments of the present disclosure may be combined arbitrarily if there is no conflict.

The above descriptions are only some embodiments of the present disclosure, and are not intended to limit the scope of the present disclosure.

What is claimed is:

1. An information processing method, comprising:
generating, by a first functional component, a resource graph by abstracting a capability and/or resource of an Internet of Things (IoT) device; wherein the resource graph is configured to manage and/or orchestrate an available capability and/or resource of a heterogeneous IoT device;
acquiring, by a second functional component, a task to be processed, and producing a computation graph corresponding to the task to be processed; and
performing, by a third functional component, a task allocation based on the resource graph and the computation graph.

2. The method according to claim 1, wherein the producing the computation graph corresponding to the task to be processed comprises:
decomposing, by the second functional component, the task to be processed into at least one operator, and determining a relationship between the at least one operator;
producing the computation graph corresponding to the task to be processed, based on the at least one operator and the relationship between the at least one operator.

3. The method according to claim 2, wherein the decomposing by the second functional component the task to be processed into at least one operator comprises:
decomposing, by the second functional component, the task to be processed through a first strategy, to obtain the at least one operator;
or
the producing the computation graph corresponding to the task to be processed based on the at least one operator and the relationship between the at least one operator comprises:
abstracting, by the second functional component, each of the at least one operator into corresponding nodes, and determining a relationship between the nodes based on the relationship between the at least one operator;
producing the computation graph corresponding to the task to be processed, based on the determined nodes and the relationship between the nodes.

4. The method according to claim 2, wherein the method further comprises:
optimizing, by the second functional component, the produced computation graph;
performing, by the third functional component, the task allocation based on the resource graph and the optimized computation graph.

5. The method according to claim 1, wherein a node of the computation graph represents one operator of the task to be processed; an edge of the computation graph represents a relationship between two nodes.

6. The method according to claim 1, wherein the generating the resource graph by abstracting the capability of the IoT device comprises:
discovering, by the first functional component, the IoT device in a network; detecting the capability and/or resource of the IoT device;
for each IoT device, abstracting the IoT device into corresponding nodes based on the capability and/or resource of the corresponding IoT device; and
generating the resource graph based on the abstracted nodes.

7. The method according to claim 1, wherein a node of the resource graph represents at least a part of the capability and/or resource of the IoT device; an edge of the resource graph represents a relationship between two adjacent nodes.

8. The method according to claim 1, wherein the performing the task allocation based on the resource graph and the computation graph comprises:
generating, by the third functional component, at least one task allocation strategy through a second strategy, based on the resource graph and the computation graph;
determining a task allocation strategy with a best performance from the at least one task allocation strategy; and
performing the task allocation based on the task allocation strategy with the best performance;
wherein the task allocation strategy is configured to allocate the task to be processed to at least one IoT device.

9. The method according to claim 8, wherein the generating the at least one task allocation strategy through the second strategy comprises:
generating, by the third functional component, at least one resource subgraph through the second strategy, based on the resource graph and the computation graph; wherein one resource subgraph comprises or represents a task allocation strategy; a node of the resource subgraph represents at least a part of the capability and/or resource of the IoT device; an edge of the resource subgraph represents a relationship between two adjacent nodes;
or
the determining the task allocation strategy with the best performance from the at least one task allocation strategy comprises:
predicting, by the third functional component, a performance of each task allocation strategy; and determining the task allocation strategy with the best performance based on the predicted performance of each task allocation strategy.

10. The method according to claim 9, wherein the predicting the performance of each tasking strategy comprises:

extracting, by the third functional component, features of the computation graph to obtain a first feature set, and extracting features of each resource subgraph to obtain a plurality of second feature sets; wherein one resource subgraph comprises or represents a task allocation strategy;

for each task allocation strategy, predicting the performance of the corresponding task allocation strategy based on the first feature set and the corresponding second feature set.

11. The method according to claim 10, wherein the extracting by the third functional component the features of the computation graph to obtain the first feature set and extracting the features of each resource subgraph to obtain the plurality of second feature sets comprises:

extracting, by the third functional component, the features of the computation graph through a feature extracting network to obtain the first feature set, and extracting the features of each resource subgraph through the feature extracting network to obtain the plurality of second feature sets;

or the predicting the performance of the corresponding task allocation strategy based on the first feature set and the corresponding second feature set comprises:

obtaining, by the third functional component, predicted data corresponding to the corresponding task allocation strategy through a prediction network, based on the first feature set and the corresponding second feature set; and determining the predicted performance of the corresponding task allocation strategy based on the predicted data corresponding to the corresponding task allocation strategy.

12. The method according to claim 11, wherein the determining the predicted performance of the corresponding task allocation strategy based on the predicted data corresponding to the corresponding task allocation strategy comprises:

performing, by the third functional component, a weighting processing on the predicted data corresponding to the corresponding task allocation strategy according to a preset weight, to determine the predicted performance of the corresponding task allocation strategy.

13. The method according to claim 11, wherein the feature extraction network is obtained through a training based on a training data set; an optimized network parameter is obtained through the training; the optimized network parameter is configured to extract features favorable to improve a performance prediction accuracy;

or the prediction network is obtained through a training based on a training data set; an optimized network parameter is obtained through the training; the optimized network parameter is configured to improve a performance prediction accuracy.

14. The method according to claim 13, wherein the method further comprises:

after performing the task allocation, the third functional component acquiring an actual performance when the task to be processed is executed based on the task allocation strategy with the best performance; and storing the task allocation strategy with the best performance and the obtained actual performance into the training data set.

15. An information processing method, comprising:

acquiring a task to be processed; and producing a computation graph corresponding to the task to be processed; wherein the task to be processed comprises a computing task; a node of the computation graph represents one operator of the task to be processed; an edge of the computation graph represents a relationship between two nodes;

optimizing the produced computation graph, to obtain an optimized computation graph; wherein the optimized computation graph is configured to perform a task allocation in combination with a resource graph; the resource graph is generated by abstracting a capability and/or resource of an Internet of Things (IoT) device; the resource graph is configured to manage and/or orchestrate an available capability and/or resource of a heterogeneous IoT device.

16. The method according to claim 15, wherein the producing the computation graph corresponding to the task to be processed comprises:

decomposing the task to be processed into at least one operator, and determining a relationship between the at least one operator;

producing the computation graph corresponding to the task to be processed, based on the at least one operator and the relationship between the at least one operator.

17. The method according to claim 16, wherein the decomposing the task to be processed into at least one operator comprises:

decomposing the task to be processed through a first strategy, to obtain the at least one operator.

18. The method according to claim 16, wherein the producing the computation graph corresponding to the task to be processed based on the at least one operator and the relationship between the at least one operator comprises:

abstracting each of the at least one operator into corresponding nodes, and determining a relationship between the nodes based on the relationship between the at least one operator;

producing the computation graph corresponding to the task to be processed, based on the determined nodes and the relationship between the nodes.

19. An electronic device, comprising: a processor and a memory configured to store a computer program executable on the processor, wherein the processor is configured to execute the computer program to perform the method according to claim 15.

20. An electronic device, comprising: a processor and a memory configured to store a computer program executable on the processor, wherein the processor is configured to execute the computer program to perform;

generating a resource graph by abstracting a capability and/or resource of an Internet of Things (IoT) device; wherein the resource graph is configured to manage and/or orchestrate an available capability and/or resource of a heterogeneous IoT device;

acquiring a task to be processed, and producing a computation graph corresponding to the task to be processed; and performing a task allocation based on the resource graph and the computation graph.

* * * * *